United States Patent
Carlson et al.

(10) Patent No.: US 7,025,847 B2
(45) Date of Patent: Apr. 11, 2006

(54) SEGMENTED SHEETING AND METHODS OF MAKING AND USING SAME

(75) Inventors: Eugene H. Carlson, Apple Valley, MN (US); James C. Coderre, Lake Elmo, MN (US); Christopher L. Harvey, St. Paul, MN (US); James E. Lasch, Oakdale, MN (US); David W. Meitz, St. Paul, MN (US); Colleen C. Nagel, Arden Hills, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/606,911

(22) Filed: Jun. 26, 2003

(65) Prior Publication Data

US 2003/0235674 A1 Dec. 25, 2003

Related U.S. Application Data

(62) Division of application No. 09/740,215, filed on Dec. 18, 2000.

(60) Provisional application No. 60/173,953, filed on Dec. 30, 1999.

(51) Int. Cl.
  *B44C 1/165* (2006.01)
  *B32B 5/00* (2006.01)
  *B32B 31/00* (2006.01)

(52) U.S. Cl. ............... 156/230; 156/233; 156/235; 156/238; 156/247; 156/250

(58) Field of Classification Search ............ 156/230, 156/71, 235, 247, 249, 277, 233, 238–240, 156/250; 428/404, 207, 40.1, 40.7, 41.6, 428/41.7, 41.8, 41.9, 913; 359/515, 529, 359/530, 534, 546
See application file for complete search history.

(56) References Cited

U.S. PATENT DOCUMENTS 2,326,634 A 8/1943 Gebhard et al.
(Continued)

FOREIGN PATENT DOCUMENTS

| FR | 2.213.377 | 8/1974 |
| GB | 2 154 177 A | 9/1985 |
| GB | 2 255 313 A | 11/1992 |
| GB | 2 267 865 A | 12/1993 |
| WO | WO 00/61355 | 10/2000 |
| WO | WO 00/72055 A1 | 11/2000 |

OTHER PUBLICATIONS

United Nations "Agreement Concerning the Adoption of Uniform Technical Prescriptions for Wheeled Vehicles, Equipment and Parts which can be Fitted and/or be used on Wheeled Vehicles and the Conditions for Reciprocal Recognition of Approvals Granted on the Basis of These Prescriptions" (Rev. 2/Add.103; E/ECE/324; E/ECE/TRANS/505; Jan. 22, 1998.

*Primary Examiner*—Sue A. Purvis
(74) *Attorney, Agent, or Firm*—Sandra K. Szezerbicki

(57) ABSTRACT

The present invention provides a new sheeting article that may suitably include: a carrier having a first major surface and a second major surface; and a plurality of discrete segments of a sheeting (e.g., a retroreflective sheeting), wherein the sheeting has a first major viewing surface and a second major opposing surface, and the first major viewing surface of the sheeting is preferably removably attached to the second major surface of the carrier. Preferably, the first major surface of the carrier comprises a release surface, the second major opposing surface of the sheeting comprises an adhesive, the article is provided in the form of a roll, and the adhesive surface of the sheeting is adjacent the release surface of an adjacent layer of the roll. In a presently preferred embodiment the present invention provides novel easy-to-use truck conspicuity sheeting.

14 Claims, 12 Drawing Sheets

U.S. PATENT DOCUMENTS

| | | |
|---|---|---|
| 2,354,018 A | 7/1944 | Heltzer et al. |
| 2,354,048 A | 7/1944 | Palmquist |
| 2,354,049 A | 7/1944 | Palmquist |
| 2,379,702 A | 7/1945 | Gebhard |
| 2,379,741 A | 7/1945 | Palmquist |
| 2,407,680 A | 9/1946 | Palmquist et al. |
| 3,190,178 A | 6/1965 | McKenzie |
| 3,551,025 A | 12/1970 | Bingham et al. |
| 3,795,435 A | 3/1974 | Schwab |
| 3,865,770 A | 2/1975 | Blake |
| 3,871,336 A | 3/1975 | Bergman |
| 3,924,929 A | 12/1975 | Holmen et al. |
| 3,936,567 A | 2/1976 | Vesely |
| 4,025,159 A | 5/1977 | McGrath |
| 4,085,314 A | 4/1978 | Schultz et al. |
| 4,202,600 A | 5/1980 | Burke et al. |
| 4,248,748 A | 2/1981 | McGrath et al. |
| 4,407,233 A | 10/1983 | Bozzacco |
| 4,413,080 A | 11/1983 | Blake |
| 4,530,859 A | 7/1985 | Grunzinger, Jr. |
| 4,569,960 A | 2/1986 | Blake |
| 4,588,258 A | 5/1986 | Hoopman |
| 4,656,072 A | 4/1987 | Coburn, Jr. et al. |
| 4,663,213 A | 5/1987 | Bailey et al. |
| 4,664,966 A | 5/1987 | Bailey et al. |
| 4,775,219 A | 10/1988 | Appeldorn et al. |
| 4,946,742 A | 8/1990 | Landin |
| 4,950,525 A | 8/1990 | Bailey |
| 4,955,690 A | 9/1990 | Bacon, Jr. |
| 4,985,488 A | 1/1991 | Landin |
| 5,040,461 A | 8/1991 | Van-Ocker |
| 5,064,272 A | 11/1991 | Bailey et al. |
| 5,069,964 A | 12/1991 | Tolliver et al. |
| 5,125,995 A | 6/1992 | D'Haese et al. |
| 5,138,488 A | 8/1992 | Szczech |
| 5,202,168 A | 4/1993 | Turner et al. |
| 5,270,111 A | 12/1993 | D'Haese et al. |
| 5,334,686 A | 8/1994 | Ando et al. |
| 5,376,431 A | 12/1994 | Rowland |
| 5,380,779 A | 1/1995 | D'Haese |
| 5,391,015 A | 2/1995 | Kaczmarczik et al. |
| 5,397,614 A | 3/1995 | Patnode et al. |
| 5,450,235 A | 9/1995 | Smith et al. |
| 5,453,320 A | 9/1995 | Harper et al. |
| 5,460,880 A | 10/1995 | Patnode et al. |
| 5,491,586 A | 2/1996 | Phillips |
| 5,580,417 A | 12/1996 | Bradshaw |
| 5,584,962 A | 12/1996 | Bradshaw et al. |
| 5,601,682 A | 2/1997 | Longtin |
| 5,605,761 A | 2/1997 | Burns et al. |
| 5,614,286 A | 3/1997 | Bacon, Jr. et al. |
| 5,620,613 A | 4/1997 | Olsen |
| 5,632,946 A | 5/1997 | Bacon, Jr. et al. |
| 5,639,530 A | 6/1997 | Miron et al. |
| 5,641,378 A | 6/1997 | Luhman et al. |
| 5,642,222 A | 6/1997 | Phillips |
| 5,706,132 A | 1/1998 | Nestegard et al. |
| 5,706,133 A * | 1/1998 | Orensteen et al. .......... 359/530 |
| 5,714,223 A | 2/1998 | Araki et al. |
| 5,754,338 A | 5/1998 | Wilson et al. |
| 5,784,198 A | 7/1998 | Nagaoka |
| 5,804,610 A | 9/1998 | Hamer et al. |
| 5,812,316 A | 9/1998 | Ochi et al. |
| 5,817,376 A | 10/1998 | Everaerts et al. |
| 5,820,988 A | 10/1998 | Nagaoka |
| 5,858,545 A | 1/1999 | Everaerts et al. |
| 5,861,211 A | 1/1999 | Thakkar et al. |
| 5,882,771 A | 3/1999 | Klein et al. |
| 5,888,335 A | 3/1999 | Kobe et al. |
| 5,905,099 A | 5/1999 | Everaerts et al. |
| 5,908,695 A | 6/1999 | Kobe et al. |
| 5,912,059 A | 6/1999 | Jones et al. |
| 5,914,812 A | 6/1999 | Benson et al. |
| 5,916,399 A * | 6/1999 | Olsen ........................ 156/230 |
| 5,962,546 A | 10/1999 | Everaerts et al. |
| 6,004,670 A | 12/1999 | Kobe et al. |
| 6,100,217 A | 8/2000 | Nagaoka |
| 6,508,559 B1 * | 1/2003 | Bacon et al. ............... 359/530 |

\* cited by examiner

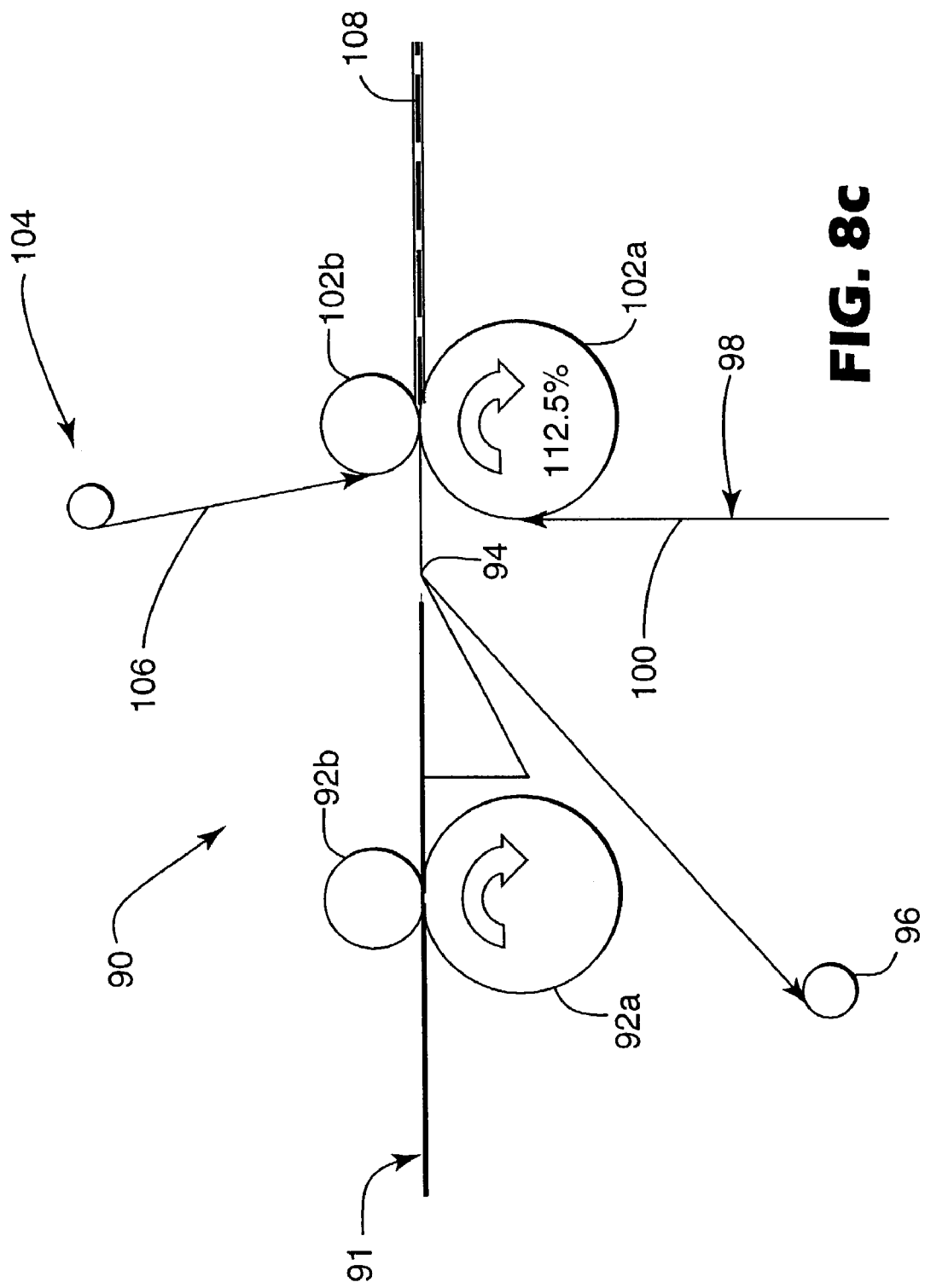

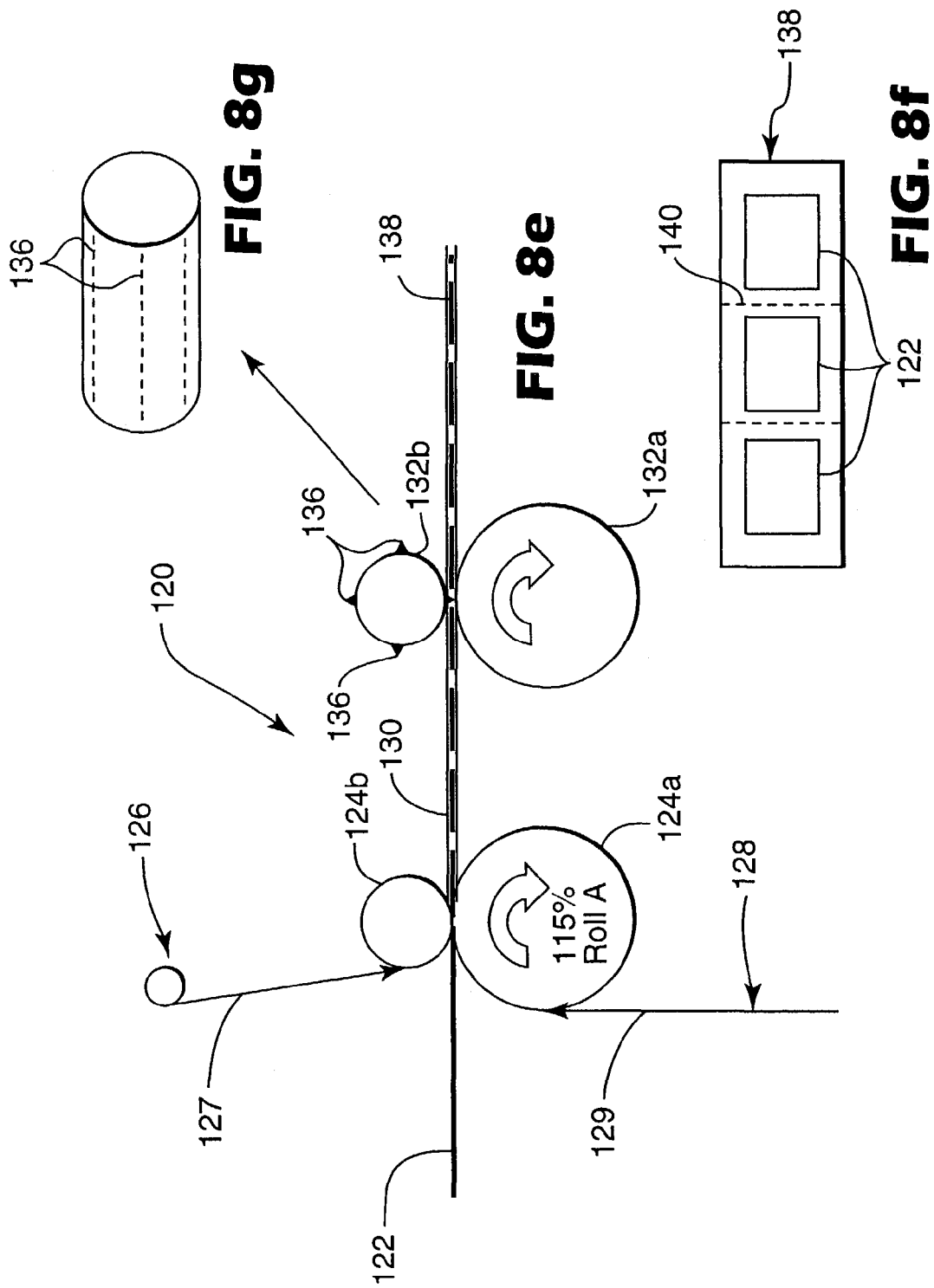

SEGMENTED SHEETING AND METHODS OF MAKING AND USING SAME

CROSS-REFERENCE TO CO-PENDING APPLICATION

This application is a divisional of U.S. patent application Ser. No. 09/740,215, filed Dec. 18, 2000, which claims priority from Provisional Patent Application No. 60/173,953, filed Dec. 30, 1999, both entitled SEGMENTED SHEETING AND METHODS OF MAKING AND USING SAME.

FIELD OF THE INVENTION

This invention relates to segmented sheeting, including segmented retroreflective-type sheeting suitable for use on a wide variety of substrates, including rigid or flexible substrates.

BACKGROUND

Retroreflective sheeting has long been used to improve the night time visibility (or "conspicuity") of articles and vehicles. This sheeting, which was first developed by Minnesota Mining and Manufacturing Company, St. Paul, Minn. ("3M"), has greatly improved the night time visibility of trucks and has helped prevent countless dangerous accidents.

In certain parts of the world this life-saving sheeting is now mandated by local or national governmental bodies. Often the local governmental body will pass regulations that specify, for example, precisely how much of a truck length should be delineated with the sheeting, as well as other requirements. For example, in the United States a regulation specifies sheeting shape, mounting requirements and even provides a spacing allowance between retroreflective segments. Other jurisdictions have different regulations. Unfortunately, however, the applier may not correctly apply the sheeting, for example by miscalculating the spacing requirements for their particular jurisdiction. In such cases the delineation will have to be corrected, often at considerable cost.

Also, certain types of vehicles have siding that makes it difficult to use the most cost-efficient sheeting. For example, certain canvas-sided trucks would benefit if the generally more common and less costly "rigid-type" of retroreflective sheeting could be used. Unfortunately, however, the flexible nature of the canvas siding does not work well with the more rigid-types of sheeting and the user is left to use a more costly "flexible-type" of sheeting.

From the foregoing, it will be appreciated that what is needed in the art is improved sheeting for article and vehicle conspicuity programs. Such sheeting and methods for preparing and using the same are disclosed and claimed herein.

SUMMARY

In one embodiment, the present invention provides a new sheeting article that comprises a carrier having a first major surface and a second major surface; and a plurality of discrete segments of a sheeting (e.g., a retroreflective sheeting), wherein the sheeting has a first major viewing surface and a second major opposing surface, and the first major viewing surface of the sheeting is attached, preferably "removably" attached, to the second major surface of the carrier.

In another embodiment, the present invention provides a new sheeting article that comprises a carrier having a first major surface and a second major surface; a plurality of discrete segments of a first retroreflective sheeting; and a plurality of discrete segments of a second retroreflective sheeting, wherein the sheeting has a first major viewing surface and a second major opposing surface, and the first major viewing surface of the sheeting is attached to the second major surface of the carrier. In a preferred embodiment, the first retroreflective sheeting segments are spaced along a major length of the article and at least a portion of the second retroreflective sheeting segments are interspersed therebetween.

In yet another embodiment, the present invention provides a new sheeting article that comprises a carrier having a first major surface and a second major adhesive surface; and a plurality of discrete segments of sheeting (e.g., a retroreflective sheeting), wherein the sheeting has a first major viewing surface, a second major opposing surface, and a periphery, the first major viewing surface of the sheeting is attached to the second major adhesive surface of the carrier, and the carrier extends beyond the periphery of the discrete segments of retroreflective sheeting.

In a presently preferred embodiment the present invention provides novel, easy-to-use truck conspicuity sheeting.

The present invention also provides novel methods of making and using the above articles.

One such preferred method includes the steps of providing an elongate strip of a carrier having a first major surface and a second major surface; providing an elongate strip of a retroreflective sheeting, wherein the sheeting has a first major viewing surface and a second major opposing surface (preferably an adhesive surface); cutting the elongate strip of retroreflective sheeting into smaller discrete segments; and attaching, preferably "removably" attaching, the first major viewing surface of the sheeting to the second major surface of the carrier.

Another method includes the steps of providing an elongate strip of a retroreflective sheeting on a release liner, wherein the sheeting has a first major viewing surface and a second major opposing adhesive surface protected by the liner; cutting the elongate strip of retroreflective sheeting into smaller discrete segments on the liner; stretching the liner in at least one direction to separate segments; and attaching, preferably "removably" attaching, the first major viewing surface of the sheeting to a second major surface of an elongate strip of a carrier having a first major surface and a second major surface.

Another method includes the steps of providing an elongate strip of a retroreflective sheeting on a release liner, wherein the sheeting has a first major viewing surface and a second major opposing adhesive surface protected by the liner; cutting the elongate strip of retroreflective sheeting into smaller discrete segments on the liner; removing selected portions of the sheeting to separate the remaining segments; and attaching the first major viewing surface of the sheeting to the second major surface of an elongate strip of a carrier having a first major surface and a second major surface.

One method of using the above articles includes the steps of providing an elongate strip of a conspicuity article having (i) a carrier with a first major surface and a second major surface and (ii) a plurality of discrete segments of a retroreflective sheeting having a first major viewing surface and a second major opposing adhesive surface protected by a release surface, wherein the first major viewing surface of the sheeting is attached, preferably "removably" attached, to the second major surface of the carrier; exposing the second major opposing adhesive surface of the sheeting; and applying the adhesive surface of the sheeting to a surface of a vehicle to thereby adhere the sheeting to the vehicle. In a preferred embodiment the method includes an additional step of removing the carrier from the applied article to thereby expose the first major viewing surface of the sheeting In yet another embodiment the method further comprises partially tearing the carrier along a plurality of discontinuities provided therein during the step of applying the adhesive surface of the sheeting to a flexible substrate on the vehicle.

BRIEF DESCRIPTION OF THE DRAWINGS

The present invention will be further explained with reference to the appended Figures, wherein like structure is referred to by like numerals throughout the several views.

FIGS. 8a–8g schematically illustrate alternative manufacturing processes of the present invention.

These figures, which are idealized, are not to scale and are intended to be merely illustrative and non-limiting.

DETAILED DESCRIPTION OF PREFERRED EMBODIMENTS

The present invention provides retroreflective sheeting articles (and methods of making and using such articles) that solve one or more of the unmet needs noted above.

In one embodiment, the present invention relates to retroreflective truck conspicuity sheeting having a carrier. The carrier preferably facilitates the placement and/or orientation of retroreflective segments on a substrate. For example, the articles of the present invention may be easily adapted for use on flexible substrates such as canvas truck sides. As used herein, retroreflectivity includes any article that provides a reflected beam back toward the source for angles of incidence that are not normal to a viewing surface of the article. Thus, a retroreflective article can be any suitable type of article including, for example, prismatic, encapsulated beads, embedded beads, and enclosed type retroreflective articles.

Figure 1A:
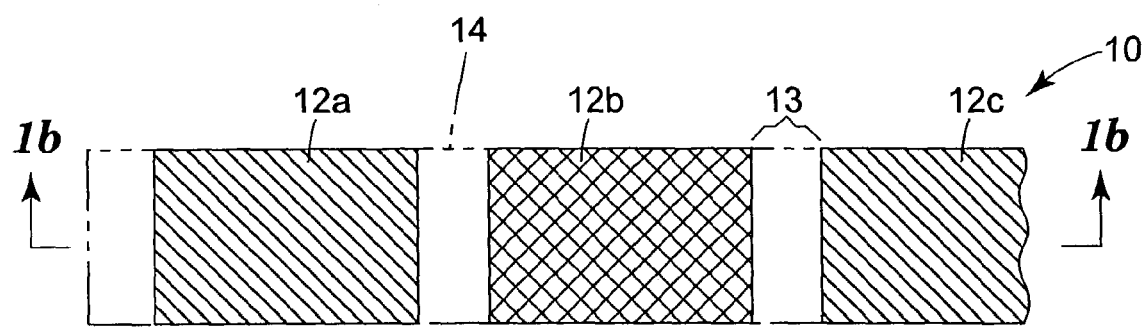
FIG. 1a shows a top view of one embodiment of the segmented sheeting of the present invention.
Figure 1B:
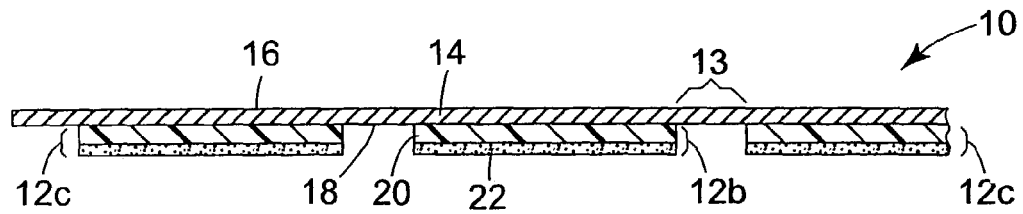
FIG. 1b is a cross-sectional view of the segmented sheeting of FIG. 1a, taken along line 1b—1b.

FIG. 1a shows a top view of one embodiment of a segmented sheeting article 10 of the present invention. FIG. 1b is a cross-sectional view of the segmented sheeting of FIG. 1a, taken along line 1b—1b. As shown, segmented sheeting article 10 includes a carrier 14 having a first major surface 16 and a second major surface 18. Sheeting article 10 further includes a plurality of sheeting segments, typically retroreflective sheeting segments 12 (12a, 12b, 12c) or "pieces" attached to the carrier. Sheeting segments 12 (12a, 12b, 12c) typically comprise a sheeting viewing surface 20 (typically a retroreflective backing) and an adhesive layer 22. Sheeting segments 12 are discrete and may optionally be separated from adjacent segments by a gap 13. Segments 12a, 12b, 12c, etc. may be the same or different. For example, 12a and 12c could be of a first type and 12b of a second type of sheeting. This construction may be used to provide an article with, for example, alternating red and white colors.

In one embodiment, first major surface 16 comprises an optional release coating. Suitable such release coatings include low adhesion backsize (LABs) such as are common in the pressure sensitive adhesive tape industry. When the carrier 14 comprises an optional release surface or coating, the sheeting article 10 may be conveniently provided in the form of a pad or roll and adhesive layer 22 placed in contact with the optional release surface or coating of an adjacent carrier, e.g., when adjacent layers of a roll are placed in contact.

Figure 2A:
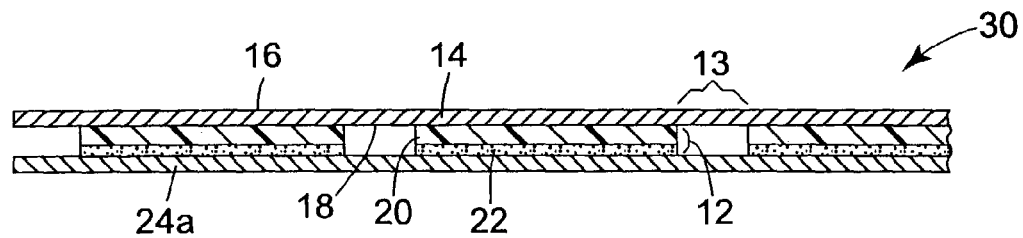
FIGS. 2a and 2b show alternative cross-sectional views of the segmented sheeting of the present invention and further illustrate alternative liners for use therewith.
Figure 2B:
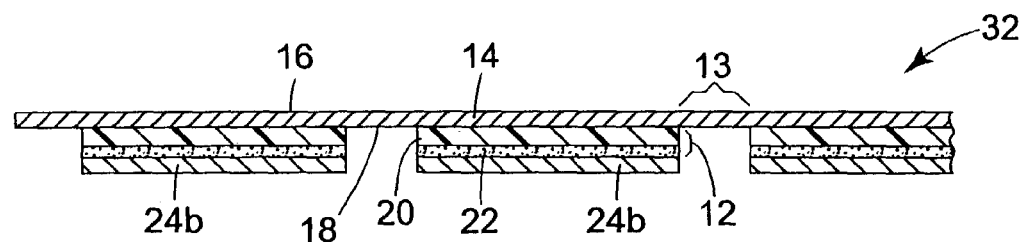

FIGS. 2a and 2b show alternative cross-sectional views of the segmented sheeting of the present invention and further illustrate alternative liners for use therewith. In FIG. 2a, segmented sheeting 30 is provided with a separate "continuous" release liner 24a. The function of the release liner is to protect the adhesive layer 22 prior to its use against a substrate. In use, release liner 24a would be removed (e.g., peeled off) to expose adhesive 22 prior to application of the article to a substrate. In FIG. 2b, segmented sheeting 32 is provided with a separate "segmented" release liner 24b. As described above, the liner pieces would be removed prior to application of the article to a substrate.

FIGS. 3a–3g show top views of alternative segmented sheeting of the present invention, wherein the sheeting portion comprises an exemplary variety of shapes, patterns and/or spacing therebetween.

Figure 3A:
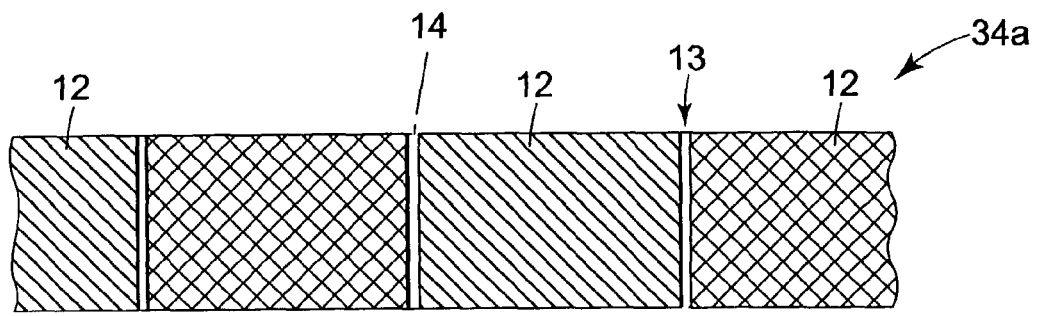
FIGS. 3a–3g show top views of alternative segmented sheeting of the present invention, wherein the sheeting portion comprises an exemplary variety of shapes, patterns and/or spacing therebetween.

The article of FIG. 3a is similar to that shown in FIG. 1a, however, the gap 13 between adjacent segments 12 is smaller. It is within the scope of the present invention to have no gap between adjacent segments. However, for use on flexible substrates, e.g., canvas truck sides, the presence of a gap is preferred. Such gaps allow greater flexibility in the resultant truck side, particularly when the sheeting is of a more rigid-type of sheeting. As will be illustrated in greater detail later, some of the embodiments that employ gaps are utilized without generating waste, known as material weed.

Figure 3B:
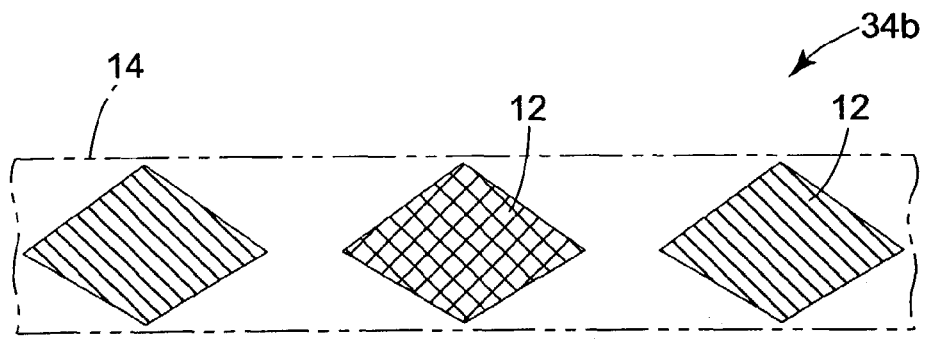

The article of FIG. 3b illustrates segments 12 having "diamond" shapes. One method of producing such shapes is to cut square or rectangular shapes from a strip (thereby not wasting any sheeting) and rotate the segments 45 degrees when attaching them to the carrier.

Figure 3C:
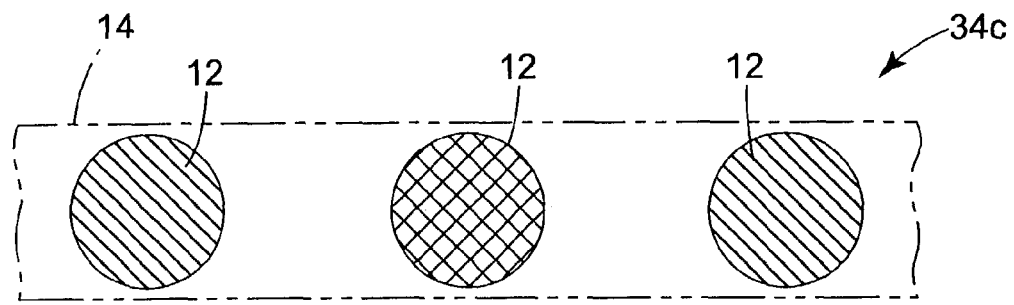

The article of FIG. 3c illustrates segments 12 having "circular" shapes.

Figure 3D:
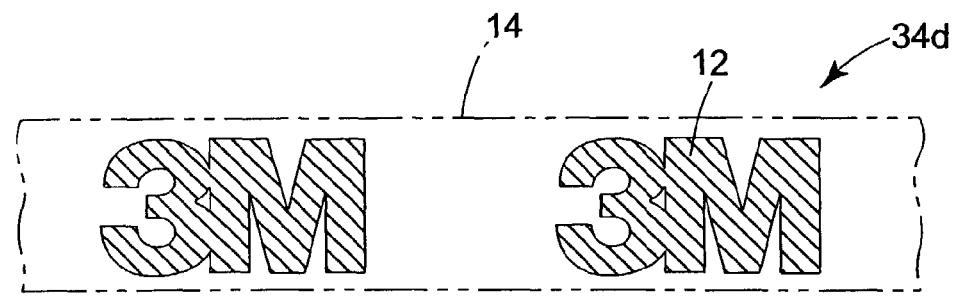

The article of FIG. 3d illustrates segments 12 having "irregular" shapes such as might constitute a logo or message.

Figure 3E:
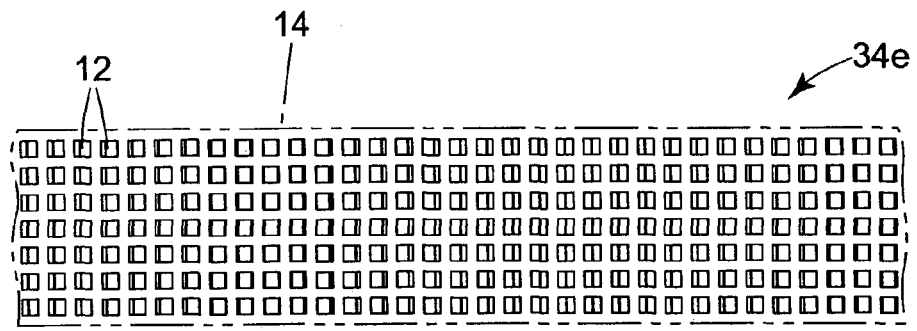

The article of FIG. 3e illustrates an article 34e having a large number of small segments 12 having "rectangular" shapes. One method of producing such an article is to (1) "kiss" cut (a "kiss" cut is a partial cut that does not extend through all layers) a retroreflective strip on a stretchable liner into a pattern of small rectangles, (2) stretch the strip (either lengthwise or widthwise or both) to separate the segments, and then (3) attach the separated segments to a carrier. This method can be utilized with any other "packable" pattern, i.e., any other pattern than packs together and can be cut from a sheet with minimal or no waste.

Figure 3F:
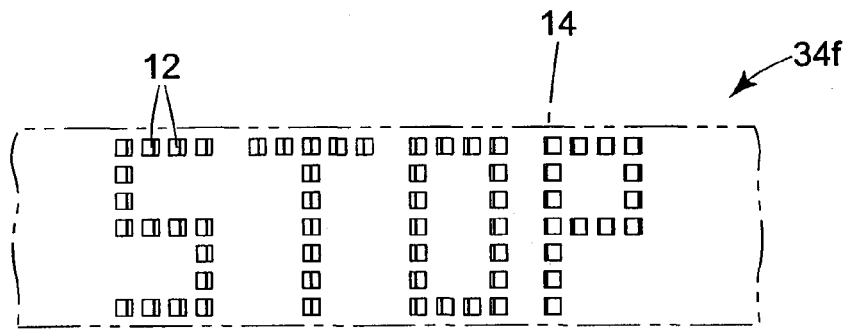

FIG. 3f illustrates an article 34f having a plurality of discrete segments 12 which combined reveal a message or graphic.

Figure 3G:
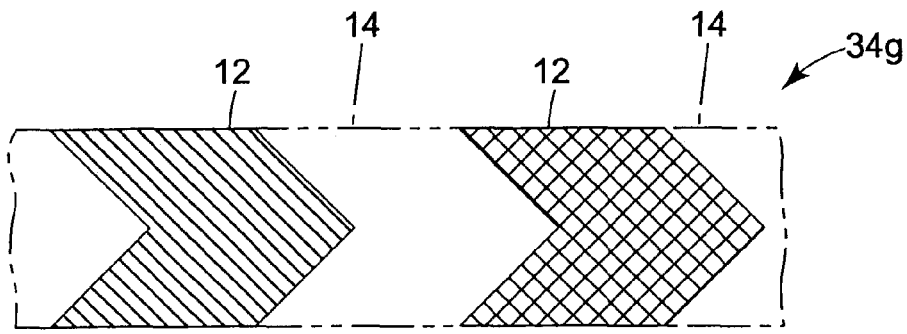

The article of FIG. 3g illustrates segments 12 having "chevron" shapes.

Figure 4:
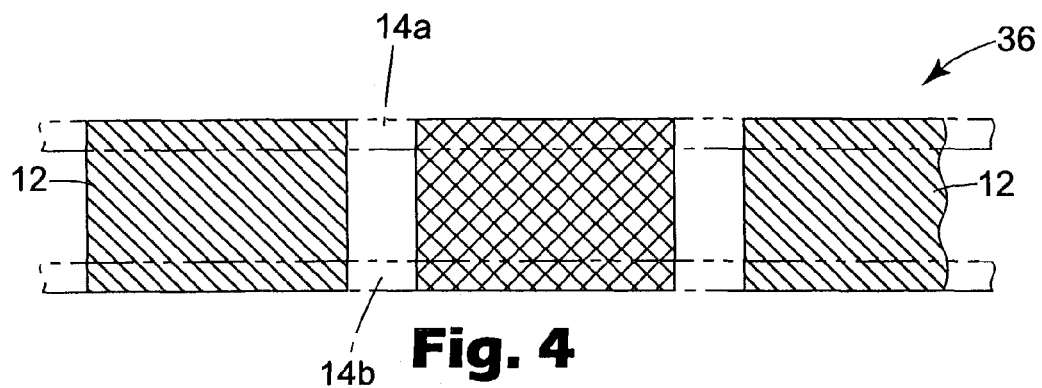
FIG. 4 shows a top view of an alternative embodiment of the segmented sheeting of the present invention having two carrier strips rather than a single carrier.

FIG. 4 shows a top view of an alternative embodiment of a segmented sheeting article 36 of the present invention. As shown, segmented sheeting article 36 includes two carriers 14 (14a, 14b) along each edge of the article. Sheeting article 36 further includes a plurality of sheeting segments 12 or "pieces" (typically retroreflective sheeting segments) attached to the carriers.

Figure 5A:
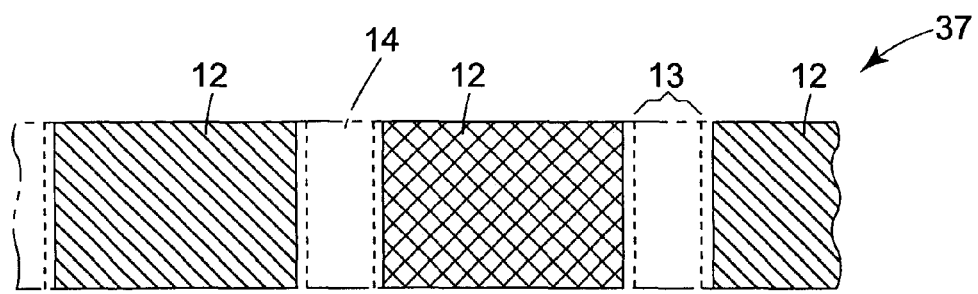
FIG. 5a shows a top view of another embodiment of the segmented sheeting of the present invention wherein the carrier is segmented.
Figure 5B:
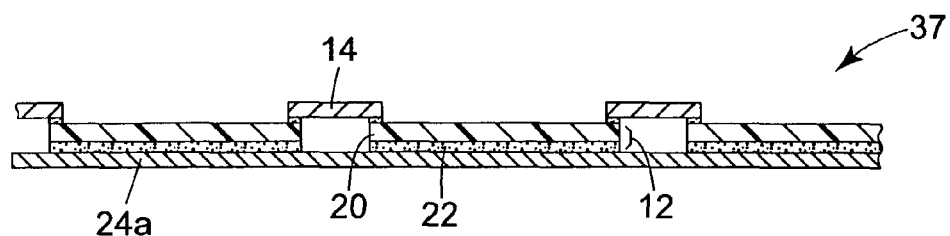
FIG. 5b is a cross-sectional view of the segmented sheeting of FIG. 5a, taken along line 5b—5b.

FIG. 5a shows a top view of another embodiment of a segmented sheeting article 37 of the present invention. FIG. 5b is a cross-sectional view of the segmented sheeting of FIG. 5a, taken along line 5b—5b. As shown, segmented sheeting article 37 includes a plurality of segmented carrier pieces 14. Sheeting article 37 further includes a plurality of sheeting segments 12 (typically retroreflective sheeting segments) attached to the carrier. If desired, the carrier may be permanently attached to the sheeting segments, e.g., by use of a permanent adhesive, bonding, sonic welding, riveting, sewing, or other methods. The carrier pieces in such cases remain attached to the article after it has been applied to a substrate and are not subsequently removed. Sheeting segments 12 typically comprise a retroreflective surface 20 and an adhesive layer 22. Sheeting segments 12 are discrete and may optionally and preferably be separated from adjacent segments by a gap 13. If desired, an optional release liner 24a (or a segmented release liner, not shown) may be used.

Figure 6:
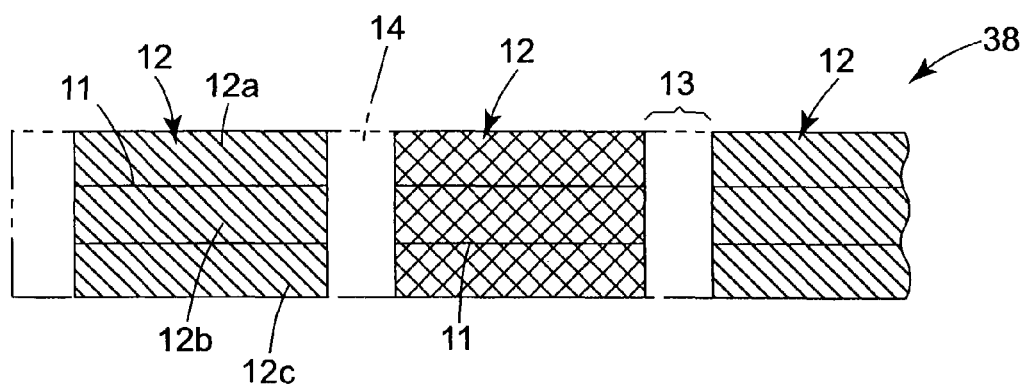
FIG. 6 shows a top view of another embodiment of the segmented sheeting of the present invention wherein the sheeting portion is further segmented along the lengthwise axis.

FIG. 6 shows a top view of another embodiment of the segmented sheeting 38 of the present invention, wherein the sheeting portion 12 is further segmented into three smaller pieces (12a, 12b, and 12c). The embodiments shown in FIG. 6 illustrate an article where separations exist between adjacent segments 12, however, it is within the scope of this invention that smaller gaps or no gaps be present therebetween. Also, it is within the scope of this invention that gaps exist between pieces 12a, 12b and/or 12c.

One feature of the sheeting of FIG. 6 is that increased flexibility can be achieved by providing cut lines 11. In most preferred embodiments of the present invention, the cut lines 11 do not substantially adversely affect the performance properties of the sheeting. For example, when segment 12 comprises a sealed prismatic or beaded retroreflective sheeting, it may be preferable to seal the edges of the segment pieces to avoid subsequent loss of performance of the sheeting. Such edge sealing may not be necessary in the case of retroreflective sheeting that utilizes, a reflective coating layer rather than an air interface.

Figure 7A:
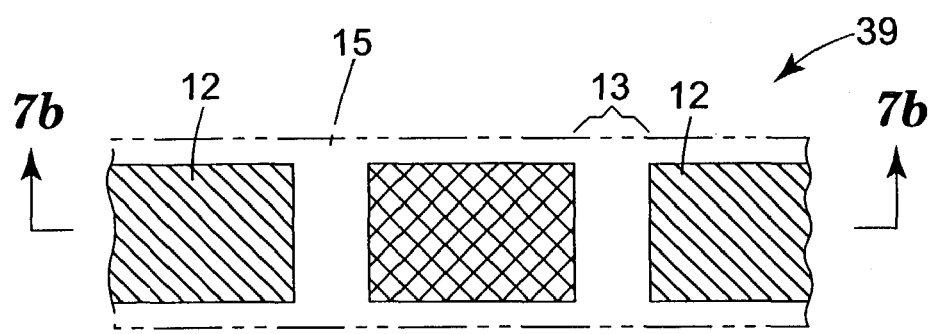
FIG. 7a shows a top view of another embodiment of the segmented sheeting of the present invention wherein the carrier extends beyond the edges of the sheeting segments.
Figure 7B:
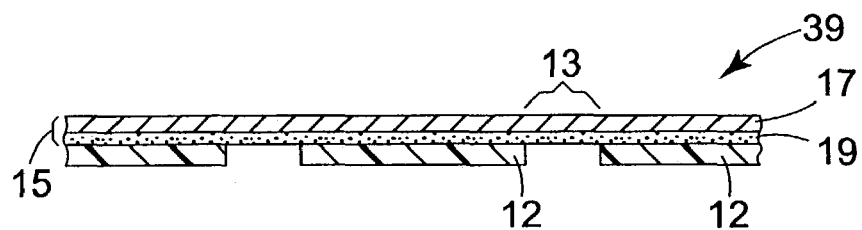
FIG. 7b is a cross-sectional view of the segmented sheeting of FIG. 7a, taken along line 7b—7b.

FIG. 7a shows a top view of another embodiment of the segmented sheeting 39 of the present invention wherein the carrier 15 extends beyond the edges of the sheeting portion. FIG. 7b is a cross-sectional view of the segmented sheeting of FIG. 7a, taken along line 7b—7b. In this embodiment, carrier 15 is shown having a backing layer 17 and an adhesive layer 19. The extension of carrier 15 beyond the edges of the sheeting portion 12 allows the carrier to be used, if desired, to secure the article to a substrate or to seal the sheeting from the surrounding environment. Consequently, in this embodiment there is no requirement that portion 12 comprise its own adhesive layer, though such a layer may be utilized if desired.

Figure 8A:
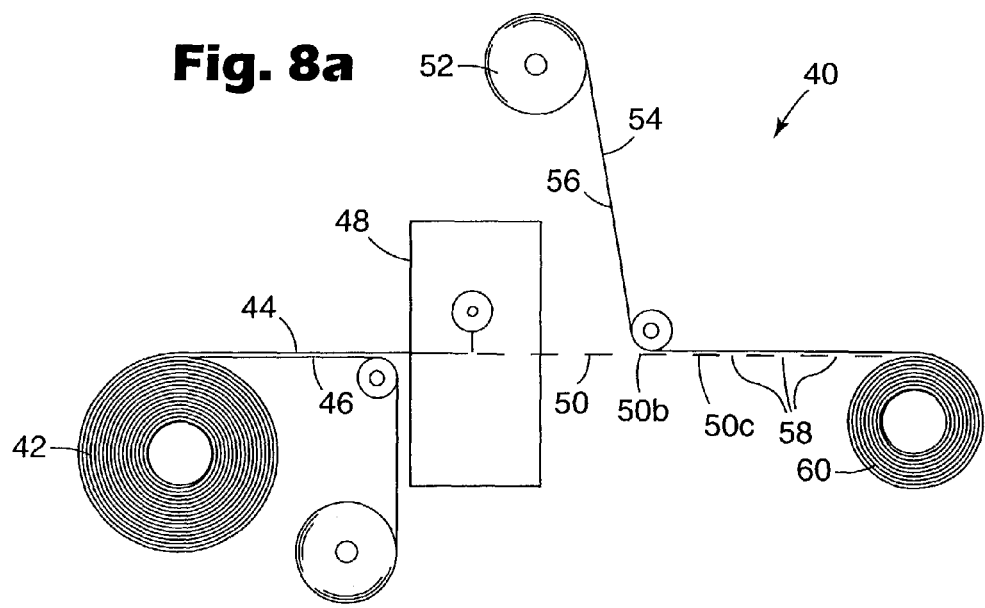

FIG. 8a schematically illustrates one manufacturing process 40 of the present invention. In this process a roll 42 of sheeting 44 (typically retroreflective sheeting) (shown on an optional release liner) is unwound and passed through a cutting apparatus 48 to form a segment 50 of sheeting. The segment 50 is then positioned against a carrier 52 and attached thereto. In preferred embodiments of this process, the carrier comprises an adhesive surface 56 that secures the segment thereto. In preferred embodiments the segments (50, 50b, 50c, etc.) are positioned along the carrier with gaps 58 therebetween. In most preferred embodiments, the carrier 52 with attached segments 50 is then wound up to form a roll 60 of segmented sheeting. If desired, an optional liner (not shown) may be used to cover and protect the optional adhesive surface of the segment. Alternatively, the carrier 52 may comprise a release surface 54 and itself function as a liner.

Figure 8B:
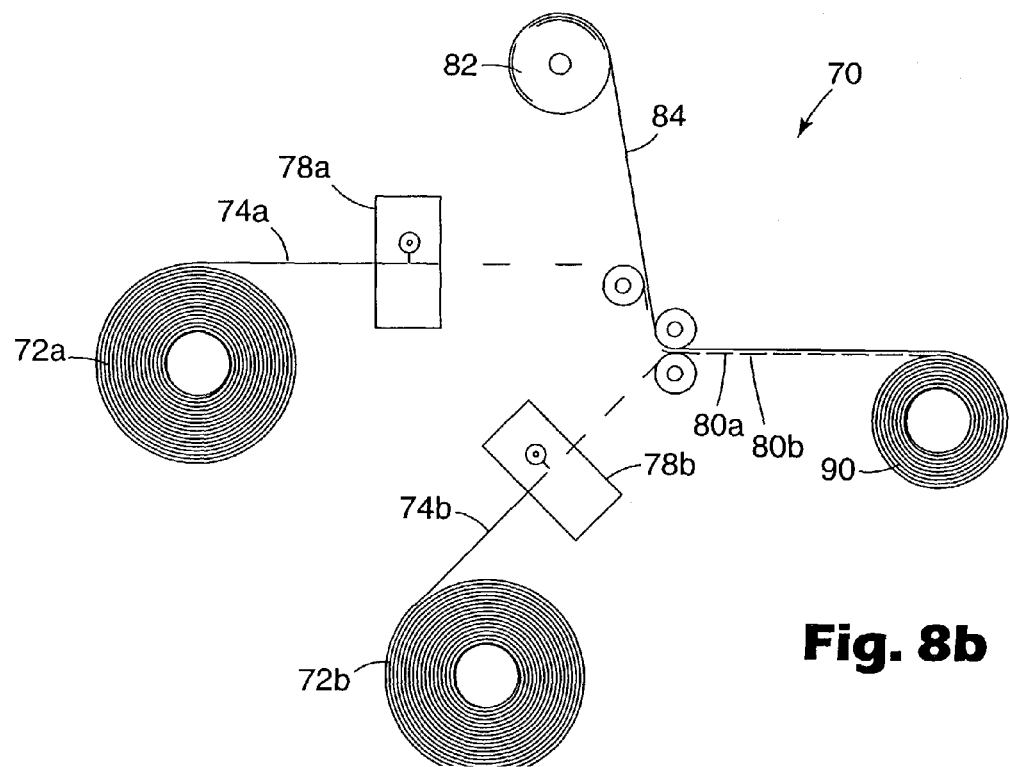

FIG. 8b schematically illustrates another manufacturing process 70 of the present invention. For simplicity, illustration of removal of the release liners is omitted in FIG. 8b, however such steps are indeed performed. In this process a first roll 72a of sheeting 74a (typically retroreflective sheeting) is unwound and passed through a cutting apparatus 78a to form a segment of sheeting 80a. The segment 80a is then positioned against a carrier 82 and attached thereto. A second roll 72b of sheeting 74b is unwound and passed through a second cutting apparatus 78b to form a segment of sheeting 80b. The segment 80b is then positioned against a carrier 82 and attached thereto, typically between segments of the first sheeting 74a. In preferred embodiments the segments are positioned along the carrier with gaps therebetween. The two sheetings (74a, 74b) may be the same or different. In one embodiment the two sheetings have different retroreflective properties (e.g., different optical properties) or different colors and the two sheetings are alternated along the carrier. In most preferred embodiments the carrier 82 with attached segments 80a and 80b is then wound up to form a roll 90 of segmented sheeting. If desired, an optional liner (not shown) may be used to cover and protect the optional adhesive surface of the segment. Alternatively, the carrier 82 may comprise a release surface 84 and itself function as a liner.

FIG. 8c schematically illustrates another manufacturing process 90 of the present invention. In this embodiment sheeting 91 is provided in the form of a plurality of cut and sealed retroreflective segments with adhesive and an adhesive carrier. Sheeting 91 is provided to drive rolls 92a and 92b, which draw sheeting 91 therethrough. At point 94, the adhesive carrier is stripped from sheeting 91 and spooled upon roll 96. Then, an adhesive liner 98 with release surface 100 is brought into contact with sheeting 91 at rollers 102a and 102b. An elongate carrier 104, having adhesive surface 106, is brought into contact with sheeting 91 at rollers 102a and 102b. The resulting product 108 includes an elongate carrier, a plurality of sheeting segments and an adhesive liner. As will be appreciated by those skilled in the art, the relative spacing between the various segments can be accurately controlled by varying the rotational speed of rollers 102a and 102b with respect to rollers 92a and 92b.

Figure 8D:
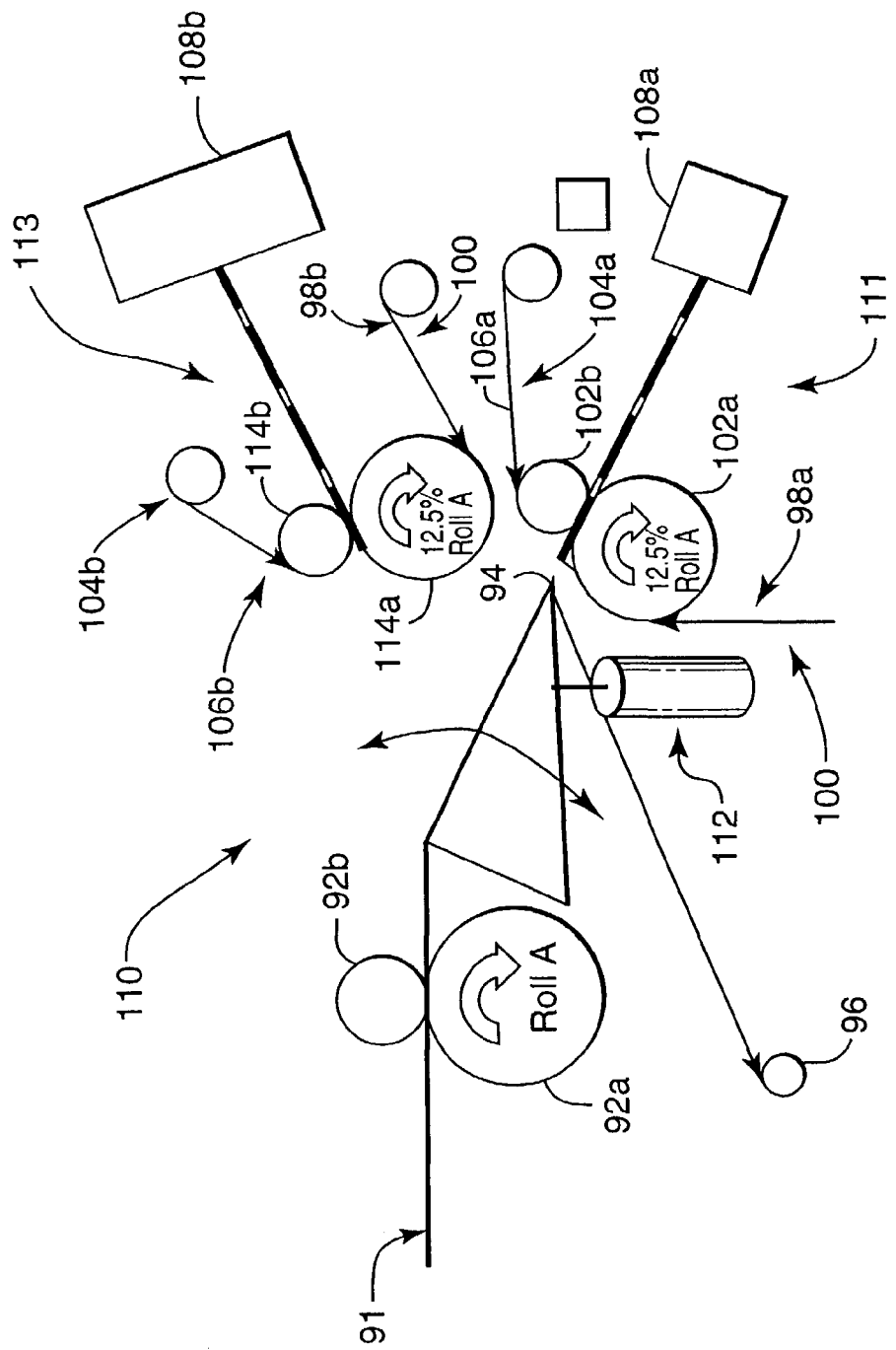

FIG. 8d schematically illustrates another manufacturing process 110 of the present invention. This embodiment is similar to that illustrated in FIG. 8c and like elements are numbered similarly. Sheeting 91 is provided in the form of a plurality of cut and sealed retroreflective segments disposed upon adhesive and an adhesive carrier. Sheeting 91 is provided to drive rolls 92a and 92b, which draw sheeting 91 therethrough. At point 94, the adhesive carrier is stripped from sheeting 91 and spooled upon roll 96. Individual sheeting segments are then provided to one of a plurality of lines 111, 113 based upon selective operation of actuator 112. Although a pair of lines 111, 113 are illustrated, those skilled in the art will appreciate that any suitable number of lines may be used. In each line, an adhesive liner 98a, 98b with release surface 100a, 100b is brought into contact with sheeting 91 at rollers 102a, 102b and 114a, 114b. Elongate carrier 104a, 104b, having adhesive surface 106a, 106b is brought into contact with sheeting 91. The resulting products 108a and 108b include an elongate carrier, a plurality of sheeting segments and an adhesive liner. This embodiment provides a pair of finished product rolls from the same stock of segmented sheeting, which finished rolls may have the same spacing between adjacent segments, or different spacing depending upon the relative speeds of rollers 102a, 102b, 114a, and 114b.

FIG. 8e schematically illustrates another manufacturing process 120 of the present invention. In this embodiment sheeting segments 122 are provided to rollers 124a and 124b along with carrier 126 (with adhesive surface 127) and adhesive liner 128 (with release surface 129). The various components are pinched together by rollers 124a and 124b to form intermediate product 130. At rollers 132a and 132b, a number of discontinuities are generated in the elongate carrier 126. Such discontinuities may take any suitable shape, but are preferably slots. One method of generating slots in carrier 126 includes using a roller 132b that includes a number of cutters 136. This is preferable because the function of a roller opposing roller 132a and the function of cutting slots are combined. However, those skilled in the art will appreciate that the various functions can separated as desired. FIG. 8g is a perspective view of the preferred roller 132b illustrating cutters 136. FIG. 8f is a top view of finished product 138 illustrating discontinuities 140 extending across the width of product 138 between segments 122.

Suitable and preferred materials and methods of assembly and use of the articles of the present invention are as follows.

Suitable articles of the present invention comprise a carrier having a first major surface and a second major surface. Preferred carriers are generally elongated strips. More preferred carriers for use in the present invention are typically provided in the form of a roll.

Suitable carriers include film and sheet backing materials. A particularly preferred carrier includes a polymeric film backing material. For example, suitable carriers include those polymeric backing films that have the strength to support the attached sheeting segments during the manufacturing process and/or during subsequent application of the article to a substrate. For certain embodiments (e.g., where the carrier is designed to be removed after application of the sheeting to a substrate), the carrier preferably has a sufficient tensile strength to permit the carrier to be easily peeled away from the attached sheeting. Alternatively, the carrier may be made of a suitable material that may be removed from the sheeting (e.g., after application of the sheeting to a substrate) by dissolving the carrier away.

In more preferred embodiments, the carrier has an adhesive surface, e.g., for attaching the sheeting segments to the carrier. Typically this adhesive will be a pressure sensitive adhesive ("PSA"), however, other suitable types of adhesives (e.g., non-tacky adhesives such as are disclosed in U.S. Pat. Nos. 6,004,670; 5,912,059; 5,908,695; and 5,888,335) may be used if desired.

Suitable PSAs include those that provide the requisite adhesion to the sheeting segments. Preferably the PSA provides suitable adhesive strength to support the sheeting segments during the manufacturing process and/or during the application of the sheeting segments to a substrate. Suitable PSAs include those described, for example, in U.S. Pat. Nos. 5,861,211; 5,905,099; 5,820,988; 5,804,610; 5,639,530; 5,584,962; 5,580,417; 5,453,320; 5,391,015; 5,334,686; 4,985,488; 4,946,742; and 4,248,748. In cases where the carrier is designed to remain attached to the applied article, the PSA preferably is selected with long term durability in mind. In cases where the carrier is intended to be removed (e.g., peeled off) after the article is applied to the substrate the choice of adhesive or the amount of adhesive used (e.g., coating weight, coating pattern or coating texture) should preferably be adjusted so that the carrier can be easily peeled off. In other words, preferably the force of adhesion to the sheeting segment and/or to the substrate is not such that the removal of the carrier causes either the sheeting segments to release from the substrate or makes removal of the carrier from the substrate too difficult.

Other suitable PSAs, e.g., for use when producing an article having a removable carrier, include water dispersible PSAs such as are described in U.S. Pat. Nos. 3,865,770; 4,413,080; 4,569,960; 5,125,995; 5,270,111; 5,380,779, 5,397,614 and 5,460,880. This type of adhesive is particularly suited for use with water dissolving carrier backings, as previously described. In cases where both the carrier backing and adhesive layer are dissolvable, e.g., with water, the carrier can be simply washed off from the substrate without the need to peel the carrier off.

It is within the scope of the present invention to use alternative attachment means. Suitable other means include "non-tacky adhesive systems" (such as are disclosed in the aforementioned patents), and/or the direct lamination to suitable polymer surfaces. With proper selection of the non-tacky adhesive system or lamination method the carrier to sheeting adhesion force may be suitably adjusted.

It is also within the scope of the present invention to use alternative "permanent" attachment means. Suitable "permanent" types of attachment include sonic welding methods, lamination methods (e.g., heat lamination), etc. For example, the carrier may be sonically welded to the sheeting using lines, spots, etc. It is recognized that the "permanence" of the attachment, however, may be varied, for example, by varying the number or size of the welds.

Suitable carriers, in addition to positioning and supporting a plurality of sheeting segments, are preferably also somewhat extensible. As has been previously described, the articles of the present invention typically comprise a carrier and a plurality of sheeting segments attached thereto. In some cases the sheeting segments may not themselves be very extensible. Segmented articles having low extensible sheeting segments may be effectively extensible primarily or only at the gaps between the segments. Consequently, preferred carriers are extensible and allow the article to be positioned along an irregular surface, e.g., bent around obstacles, bent around curves and/or corners, stretched over rivets, stretched over pre-existing fold lines in a flexible substrate, etc. Most preferably the carrier maintains its original shape (e.g., a straight lengthwise shape) during application of the article along a straight substrate, yet can be extensibly stretched by the applier when desired, e.g., to go around a wheel-well of a vehicle. In some embodiments, however, very extensible carriers are used, such as that of Example 1, Run 9 set forth below, where the degree of carrier extensibility facilitates "steering" or otherwise directing application of the retroreflective segments in non-linear applications. For example, if the segments are to be applied in an "S" pattern, the extensible carrier can be stretched and turned during application in order to generate the appropriate curves for the pattern.

In alternative embodiments, e.g., where the carrier is designed to remain attached to the article, the carrier is preferably constructed using suitable ultraviolet ("UV") light absorbers and/or other adjuvants. Preferred adjuvants help provide long-term durability to the carrier and/or underlying article. The carrier may also provide one or more feature to the article such as scratch resistance, dew resistance, mold and organism resistance, dirt resistance, graffiti resistance, etc. For example, the carrier may be constructed using Scotchlite Premium Protective Overlay Film, which comprises an ethylene tetrafluoroethylene film with an acrylate adhesive layer and which provides several of the above mentioned features. Carriers such as Prespace Tape sold by 3M under the trade designation SCPS-2, and Premask Tape sold by 3M under the trade designation SCPM-3 can also be used.

In more preferred embodiments, the carrier has a release surface. The release surface facilitates the unwinding of the carrier when it is provided in the form of a roll and/or facilitates the unwinding of the article (without unintended detachment of sheeting segments) when the article is in the form of a roll.

Suitable release surfaces include low adhesion backsize ("LAB") coatings such as are known in the adhesive tape arts. Suitable LABs include typical silicone release coating materials such as are used on the liner component provided with a graphic article commercially available from 3M under the trade designation "3M Scotchlite Premium Protective Overlay Film Series 1160." Suitable LABs are also disclosed in U.S. Pat. Nos. 5,817,376; 5,962,546; 5,858,545.

Suitable articles of the present invention comprise a plurality of discrete segments of a sheeting, e.g., retroreflective, reflective or non-reflective sheeting. Suitable such sheeting has a first major viewing surface and a second major opposing surface. In preferred embodiments the first major viewing surface of the sheeting is removably attached to the second major surface of the carrier.

Suitable retroreflective sheeting includes "beaded-type" retroreflective sheeting (e.g., exposed lens, enclosed lens, and encapsulated lens sheeting) and "prismatic-type" or "cube-corner-type" sheeting (e.g., encapsulated prismatic-type and metalized prismatic sheeting). Suitable types of retroreflective sheeting are described in ASTM D 4956-94 entitled "Standard Specification for Retroreflective Sheeting for Traffic Control". Brightness or retroreflectivity of the sheeting may be expressed as the Coefficient of Retroreflection, $R_a$. This is measured in units of candelas/lux/square meter and is determined using ASTM E 810-94.

The retroreflective sheeting may be a flexible-type sheeting or a more rigid-type sheeting. An advantage of the articles of the present invention is that rigid-types of sheeting or less extensible types of sheeting can be used, even on flexible substrates such as are found on canvas-sided trucks.

Illustrative examples of exposed lens retroreflective sheeting are disclosed in U.S. Pat. Nos. 2,326,634; 2,354,018; 2,354,048; 2,354,049; 2,379,702; and 2,379,741. Illustrative examples of enclosed lens retroreflective sheeting are disclosed in U.S. Pat. Nos. 2,407,680; 3,551,025; 3,795,435; 4,530,859; 4,588,258; 4,664,966; 4,775,219; 4,950,525; 5,064,272; and 5,882,771. Illustrative examples of encapsulated lens retroreflective sheeting are disclosed in U.S. Pat. Nos. 3,190,178; 4,025,159; 4,663,213; 5,069,964; 5,605,761; 5,714,223; 5,812,316; and 5,784,198. Illustrative examples of encapsulated prismatic-type retroreflective sheeting are disclosed in U.S. Pat. Nos. 5,138,488; 5,450,235; 5,614,286; 5,706,132; 5,714,223; and 5,754,338. Illustrative examples of other prismatic-type retroreflective sheeting are disclosed in U.S. Pat. No. 5,914,812; 5,491,586; 5,642,222; 5,376,431.

When encapsulated-type sheeting is used it is preferred that the segments be formed in such a way that the edges of the segments are sealed to prevent moisture and/or dirt contamination. This can be done in a variety of ways as is well appreciated in the art. For example, when such sheeting is manufactured a seal-line can be provided in the sheeting and the segments may be cut from the sheeting by cutting through the seal-lines. Also, the sheeting can be cut and the edges sealed in a later step by, for example, using a sealing material along the unsealed edges. Also alternatively, in certain embodiments of the present invention, the carrier itself may extend beyond the edge of the sheeting and be used to form sealed pockets (i.e., the carrier and the substrate together form a pocket), with the sheeting being contained therein.

Preferred sheeting for use in the present invention comprises an adhesive surface. The choice of adhesive is dictated by many factors, for example, the type of substrate to which the sheeting is to be adhered. In preferred embodiments the adhesive will be a PSA. Most preferably the adhesive provides durability for the intended life of the sheeting article. In addition to the adhesives disclosed in the aforementioned patents, some representative patents related to PSAs include: U.S. Pat. Nos. 5,861,211; 5,905,099; 5,820,988; 5,804,610; 5,639,530; 5,584,962; 5,580,417; 5,453,320; 5,391,015; 5,334,686; 4,985,488; 4,946,742; and 4,248,748.

Suitable retroreflective sheeting can be provided in a variety of colors, shapes, and/or have a variety of optical properties. In certain preferred embodiments of the present invention sheeting segments of more than one color or more than one optical property may be employed. For example, a carrier might comprise a plurality of "red" retroreflective sheeting segments spaced there along and with large gaps between the red sheeting segments. The large gaps, or portions of the large gaps, can then be filled with a different (e.g., a "white") retroreflective sheeting. The resultant article will comprise, for example, alternating red and white sheeting. Alternatively, segments having more than one retroreflective optical property (e.g., narrower or broader entrance and/or observation angularity) may be used along a carrier. For example, alternating segments that exhibit a particular preferred entrance angularity direction or plane (e.g., left, right, up, down, horizontal, vertical) and fluorescent properties may be positioned along the carrier to create a conspicuity article.

In preferred embodiments of the present invention the selection of adhesives and release surfaces are chosen to facilitate manufacture, handling and/or use of the article. For example, in certain embodiments the sheeting segments are designed to be removably attached to the carrier. In these embodiments the term "removably attached" means that the carrier is designed to be temporarily attached to the sheeting. For example, the sheeting segments are preferably well enough attached to the carrier that they remain attached during manufacture and handling of the article. However, in these embodiments the carrier is preferably designed to be peeled off of the sheeting without damaging the sheeting or causing the sheeting segments to be prematurely removed from the substrate to which they are applied. Also in this embodiment, preferably the carrier is designed to easily be peeled off of the substrate to which the article is applied. In more preferred embodiments (e.g., where the carrier and the sheeting each comprise a PSA and the carrier comprises a release surface), the PSAs are chosen such that the carrier and sheeting can be peeled off of the underlying layers of the roll without causing sheeting segments to separate from the adhesive surface of the carrier, and when the sheeting and carrier are applied to a substrate the adhesion of the sheeting to the substrate is high enough that the carrier can be peeled away from the sheeting without causing segments of the sheeting to separate from the substrate.

It is contemplated that this effect can be achieved in a variety of ways. For example, the selection and use of suitable low adhesion coatings (e.g., on the carrier or release liner or optionally on the viewing surface of the sheeting) can help adjust the adhesion properties. Also, the choice of adhesive, coating weight of the adhesive, or texture of the adhesive can be chosen to accomplish this end.

It is contemplated that articles of the present invention may be provided in a variety of forms. For example, for truck conspicuity purposes the articles conveniently may be provided as long strips which may be fan folded, stacked (e.g., in a pad), in roll form or packaged in some other manner. A preferred form is as a roll.

Suitable articles may include liners to protect the surfaces of the article. For example, a release liner may be used to protect an adhesive surface (e.g., a tacky adhesive surface) prior to its application against a substrate. Alternatively, the article itself may comprise a suitable release surface (e.g., on the carrier) such that when the article is provided in a pad or roll form the adhesive surfaces can be protected. This embodiment has a couple of advantages. First, it avoids the need for a separate liner, thus saving cost. Second, the user doesn't have to handle a separate liner or provide for its disposal.

The features of the present invention are useful in the manufacture or use of a variety, of articles. One such preferred article is a vehicle conspicuity article (e.g., an article for use on a car, truck, boat, railroad car, plane, trailer, ground handling equipment, farm equipment, bicycle, motorcycle, etc.). Other uses include barrel wrap conspicuity articles (e.g., for use on barrels), traffic cone and tube conspicuity articles, barrier conspicuity articles (such as for use of roadways), flexible signage, helmets (e.g., bicycle helmets), backpacks, and apparel (e.g., safety vests and jackets).

For use as a vehicle conspicuity article the article is preferably provided in a form acceptable to the respective governing body. One regulation of particular note is the United Nations "Agreement Concerning The Adoption Of Uniform Technical Prescriptions For Wheeled Vehicles, Equipment And Parts Which Can Be Fitted And/Or Used On Wheeled Vehicles And The Conditions For Reciprocal Recognition Of Approvals Granted On The Basis Of These Prescriptions (Rev. 2/Add. 103; E/ECE/324; E/ECE/Trans/ 505)". This document provides, among other things, for various specifications for conspicuity sheeting. Preferred sheeting of the present invention meets or exceeds these specifications.

Additional embodiments of the present invention were realized upon detailed analysis of common failures of retroreflective sheeting adhered to a flexible substrate such as canvas. The purpose of the analysis was to determine advantageous properties for mounting retroreflective sheeting to a canvas substrate. As described above, canvas flexes easily especially when used as a side of a truck. When flexed, the canvas bends. If the position of the segment is such that free bending of the canvas at the gap between segments does not occur then the retroreflective sheeting disposed thereon is forced to react. Retroreflective sheetings are typically laminate structures. The retroreflective sheeting-laminate will react based upon its material(s), layer thickness(es), position and distribution of materials within the laminate, and the ability of the adhesive to withstand applied loads. In general, the retroreflective laminate can fail in any of four modes.

Figure 10A:
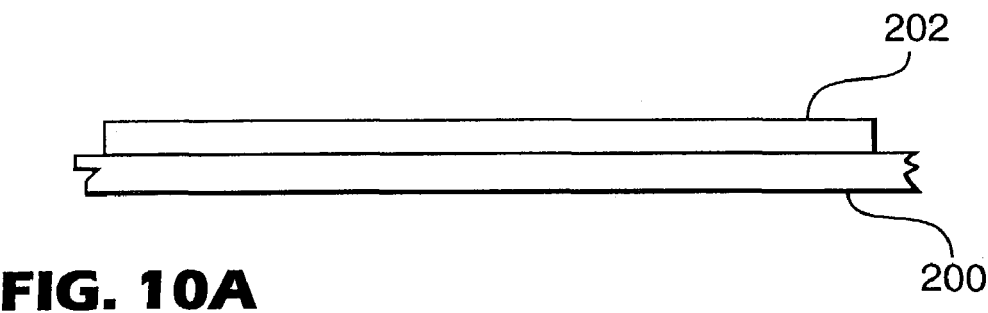
FIGS. 10–13 are diagrammatic views illustrating various failure modes.
Figure 10B:
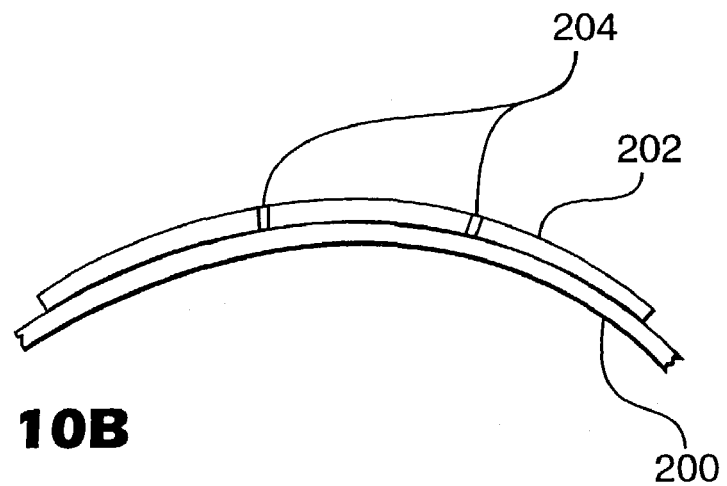

The first mode of failure is illustrated in FIGS. 10A and 10B, and occurs when the bending of the canvas puts the first major surface of the segment in tension and initiates a crack in the first major surface. In FIG. 10A, the substrate 200 and segment 202 are flat. In FIG. 10B, substrate 200 has been bent, and cracks 204 in segment 202 are formed. Such cracking can occur after many flexes or as a brittle failure on a single flex. Proper choice of material flexibility for the intended use environment can avoid this failure mode.

Figure 11:
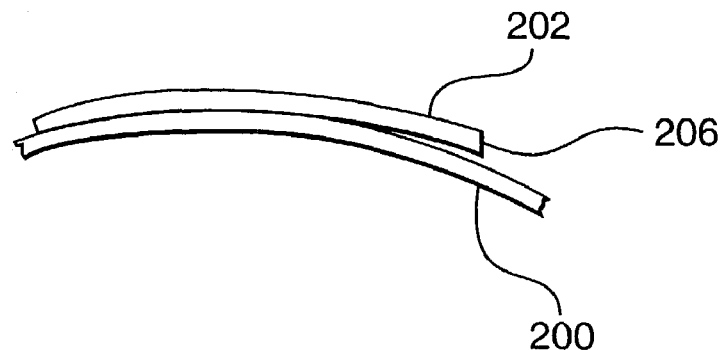

The second failure mode is illustrated in FIG. 11 and occurs when an edge, such as edge 206 of segment 202 lifts, or otherwise begins to peel back. This failure mode generally occurs when segment edge 206 is located upon a portion of substrate 200 that is bent. Segment 202 reacts applying a bending moment on the adhesive. One of the manners in which this failure mode is remedied is by choosing an adhesive that is specially adapted for the substrate. One adhesive that works particularly well with canvas is a PSA as described in U.S. Pat. No. 5,861,211. Although this adhesive is particularly suited for canvas, those skilled in the art will appreciate that any suitable adhesive can be used. However, even the best adhesive can only withstand a finite bending moment from a before it fails. Thus a second manner in which this failure mode is remedied is by choosing laminates with small bending rigidities. It is instructive to consider a simple, idealized case where the edge is bent to a constant curvature. The moment applied to the adhesive is approximated to be proportional to the rigidity of segment 202 and inversely proportional to the radius of the circle. For example empirical evidence indicates that the PSA as described in U.S. Pat. No. 5,861,211 at 70 degrees Celsius can withstand a bending moment, M, from a segment up to about $6 \times 10^{-3}$N*m before it de-bonds from a test canvas, Verseidag Indutex/German, type Duraskin 12 B129835. 3M #981 retroreflective sheeting, a typical rigid, sealed "prismatic-type" sheeting has a bending rigidity, D, of about $6 \times 10^{-5}$N*m$^2$. Thus the radius to which the a segment of 3M #981 and the PSA as described in U.S. Pat. No. 5,861,211 will withstand bending without edge-lift at 70 degrees Celsius is $$D/M = 6 \times 10^{-5} \text{N*m}^2 / 6 \times 10^{-3} \text{N*m} = 1 \times 10^{-2} \text{m} = 10 \text{ mm}.$$

Adhesives that can withstand higher moments before failure and/or use of less rigid segments would allow said segment to bend to smaller radii before failing.

Figure 12:
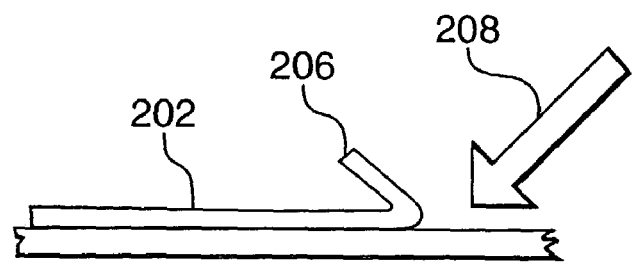

The third mode of failure is illustrated in FIG. 12 and occurs when a jet of high pressure, fast flowing water 208 impinges upon any edge of segment 202. It is believed that this failure mode is also related to the adhesive. This type of failure is believed not related to mechanical reactions, laminate properties or any width-length combination that would be unique to segments describe here. Segments from thin and flexible to thick and stiff adhered to canvas with an adhesive particularly suited for canvas seem not to fail when exposure to a high pressure jet of water.

Figure 13A:
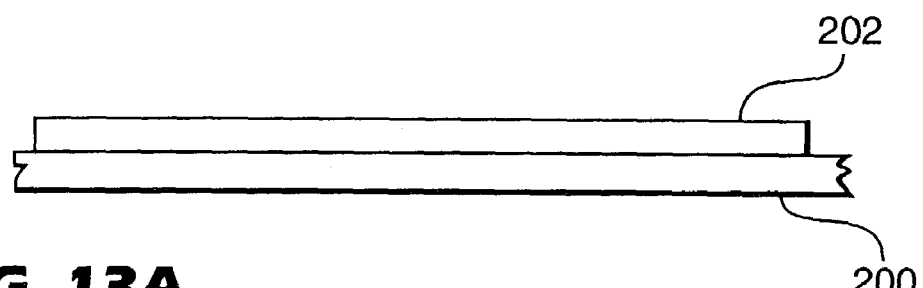
Figure 13B:
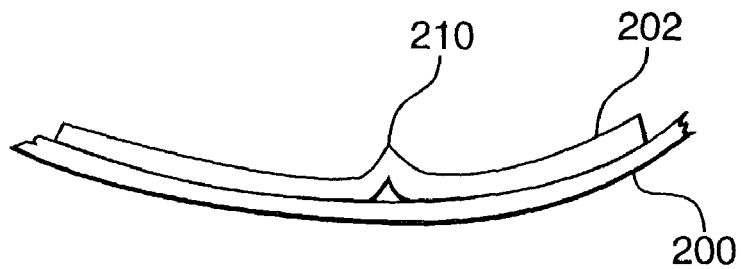

The fourth failure mode is illustrated in FIGS. 13A and 13B. This failure mode occurs when the retroreflective segment 202 is placed in compression, for example when the substrate 200 (such as canvas) to which segment 202 adheres is flexed so as to bend segment 202 around an inside arc. In this situation, a portion of the retroreflective overlay segment 202 may buckle as illustrated at wrinkle 210. The buckled portion 210 then lifts from substrate 200. A number of segments 202 made of five distinct laminates, each laminate tested with widths between 13 mm and 50 mm and lengths between 13 mm and 150 mm, were adhered to the test canvas Duraskin 12 B129835 and the constructions bent over various inside radii to determine the minimum length that avoided wrinkling. Material properties of and the five laminates relevant to the discussion that follows are listed in Tables 1.

TABLE 1a

| Material | Modulus X$10^{-8}$/Pa | Poisson's ratio |
|---|---|---|
| Glassy thermoplastic[1,2] | 6.9 | 0.3 |
| semi-crystalline thermoplastic[1] | 21 | 0.4 |
| Thermoplastic elastomer[2] | 0.21 | 0.5 |

[1]Materials used in the rigid cube corner films.
[2]Materials used in the flexible cube corner films TABLE 1b

| | Laminate constructions, most flexible to most rigid |
|---|---|
| 1 | 3.8 mil glassy thermoplastic film |
| 2 | Sealed, most flexible cube corner film |
| 3 | Vapor coated, semi-flexible cube corner film |
| 4 | Vapor coated, rigid cube corner film |
| 5 | Sealed, rigid cube corner film |

The test strips had widths W, lengths L, and were spaced apart by a distance δ. The first observation was that if the distance between the segment ends was too small, the ends butted up against each other or slide one on top of the other as the canvas was flexed. It appeared that the smallest δ that kept the ends from butting was approximately:

$$\delta_{min} \approx \left(\frac{t/2}{R}\right) \times L \qquad \text{Equation 1}$$

where t was the laminate thickness. (The term in brackets is the strain at the first major surface of the segment.) The equations below provide further details of this term.

The second observation was that, longer segment lengths failed at larger radii than shorter segments while for a given segment length, a more rigid segment would fail at smaller radius than a less rigid segment. Using shorter lengths, more rigidity, or limiting the radius above a certain size all served to attenuate the likelihood of this wrinkle failure mode.

Table 2 list minimum lengths that were observed to avoid this failure mode for segments of the five test laminate constructions bent around a 6.4 mm radius.

TABLE 2

| | Laminate constructions, most flexible to most rigid | minimum length to avoid wrinkles |
|---|---|---|
| 1 | 3.8 mil glassy thermoplastic film | 51 mm |
| 2 | Sealed, most flexible cube corner film | 51 mm |
| 3 | Vapor coated, semi-flexible cube corner film | 64 mm |
| 4 | Vapor coated, rigid cube corner film | 64 mm |
| 5 | Sealed, rigid cube corner film | 83 mm |

The following derivations are useful for analytically predicting segment failure by wrinkling. The derivations apply strictly to elastic materials. Laminates are assumed to be made up of isotropic laminae. Applied loads, deformations, and reactions are illustrated in one dimension only. When an initially flat laminate bends along one axis into a radius, R, the surface to the inside of the cylinder formed compresses while the outside surface is placed in tension. For a segment that might be made of a single layer of material (e.g. laminate construction #1) the plane midway between the surfaces is neutral since it is in neither compression nor tension. The strains, δ, at the surfaces of the layer are as follows:

$$\varepsilon = \frac{t/2}{R} \text{ for an initially flat single layer,} \qquad \text{Equation 2a}$$

Retroreflective sheetings are laminates where the neutral axis is a more complex function of the position in and moduli of the materials that make up the laminate. For the case of a laminate, the numerator of EQN. 2a is the distance, $y_n$, of the first major surface to the neutral axis. The plane of the neutral axis, like the mid-plane of the single layer, is in neither compression nor tension when the laminate is flexed. In such case, the first major surface reacts with the strain expressed in EQN. 2b:

$$\varepsilon = \frac{y_n}{R} \text{ for an initially flat laminate,} \qquad \text{Equation 2b}$$

The total compressive stress on the laminate, $P_{comp}$, can be found using EQN. 3.

$$P_{comp} = \varepsilon \times A, \qquad \text{Equation 3}$$

where A is the extensional stiffness of the laminate. For a segment of one material layer, $$A = \left(\frac{Et}{(1-v^2)}\right). \qquad \text{Equation 4a}$$

where E is the modulus, and v is Poisson's ratio. For the case of a laminate comprised of 'N' laminae, as we discuss here, A is calculated as the sum of modulus of the individual laminae weighted by its respective thickness, where i denotes the i-th lamina. For the lamina containing the first major surface, i=1. $E_i$, $t_i$, and $v_i$ are the modulus, thickness, and Poisson's ratio respectively, of the i-th lamina.

$$A = \sum_{i=1}^{N} \frac{E_i t_i}{(1-v_i^2)}, \quad \text{Equation 4b}$$

The neutral axis is located a depth $y_n$ from the first major surface of the laminate where one can calculate $y_n$ from EQN. 4c.

$$y_n = \frac{1}{2} \frac{\sum_{i=1}^{N} \left\{ \frac{E_i}{(1-v_i^2)} \left[ \left(\sum_{j=1}^{i} t_j\right)^2 - \left(\sum_{k=0}^{i-1} t_k\right)^2 \right] \right\}}{\sum_{i=1}^{N} \frac{E_i t_i}{(1-v_i^2)}}, \text{ where } t_0 = 0. \quad \text{Equation 4c}$$

The units of $P_{comp}$ and A are in force per length. A segment whether comprised of a single layer or a laminate will flex without wrinkling if $P_{comp}$ is below a critical threshold, $P_{cr}$. If $P_{comp}$ is greater than $P_{cr}$, then the segment wrinkles in response to the compressive load. The critical threshold, $P_{cr}$ is a proportional to the ratio of the bending rigidity of the segment to the square of its length or:

$$P_{cr} \equiv k \frac{D}{L^2}. \quad \text{Equation 5}$$

D is the bending rigidity of the retroreflective laminate. For a single layer segment, $$D = \frac{EI/W}{(1-v^2)}, \quad \text{Equation 6a}$$

where I is the moment of inertia for the layer, $I=t^3W/12$. For the case of a laminate D is calculated as the sum over all laminae of the product of modulus of the individual laminae to the cube of the distance that laminae is from the neutral axis. A straightforward algorithm to calculate rigidity is:

$$D = \frac{1}{3} \sum_{i=1}^{N} \frac{E_i}{(1-v_i^2)} (z_i^3 - z_{i+1}^3), \quad \text{Equation 6b}$$

where $z_i$ is the distance from mid-plane of the laminate to the interface between the i-th and (i-th+1) laminae. For example: $z_0$ is the distance from the mid-plane to the first major surface; $z_N$ is the distance from the mid-plane to the second major surface. Note, $z_0-z_1$ equals $t_1$, $z_1-z_2=t_1$ and so on; $z_0-z_N$ is the thickness of the laminate.

The proportionality, k, between the left side and right side of EQN. 5 depends on edge constraints, and other factors that add complexity. We derive an empirical relationship based on experiments with the five laminate constructions. Combining EQNS. 2 and 3 and setting EQN. 5, the critical compressive load, to less than EQN. 2, the compressive load of the bent segment, yields an expression that defines the longest segment length that avoids wrinkle failure.

$$L_{max} \leq \left[ k\left(\frac{D}{A}\right)\left(\frac{R}{y_n}\right) \right]^{1/2}. \quad \text{Equation 7}$$

For the case of a single lamina $(D/A)=t^2/12$, $y_n=(t/2)$, and EQN. 7 reduces to:

$$L_{max} \leq \left[ k \frac{t^2 R}{12\left(\frac{t}{2}\right)} \right]^{1/2} = \left[ \left(\frac{k}{6}\right) Rt \right]^{1/2} = [k' Rt]^{1/2}. \quad \text{Equation 8}$$

When the laminae of a laminate are composed of materials with similar moduli, the simpler EQN. 8 is essentially identical to the more rigorous EQN. 7. In what follows we will use the more rigorous EQN. 7. Table 3 lists the laminate properties of the constructions first shown in Table 2.

TABLE 3

| | Construction | Stiffness* $10^{-4}$ A/(N/m) | Rigidity* $10^4$ D/(N*m) | Neutral axis, $y_n$/mm |
|---|---|---|---|---|
| 1 | 3.8 mil glassy thermoplastic film | 0.97 | 0.76 | 0.048 |
| 2 | Sealed, most flexible cube corner film | 1.1 | 1.8 | 0.12 |
| 3 | Vapor coated, semi-flexible cube corner film | 1.5 | 5.4 | 0.13 |
| 4 | Vapor coated, rigid cube corner film | 2.3 | 9.8 | 0.13 |
| 5 | Sealed, rigid cube corner film | 2.6 | 24 | 0.20 |

Table 4, shown below, combines the results listed first in Table 2 and the values calculated as suggested from EQN. 7.

TABLE 4

| Construction | Minimum length/mm to avoid wrinkles, $L_{min}$ | $(D/A*(R/y_n))^{1/2}$/mm R = 6.4 mm |
|---|---|---|
| 1 | 51 | 0.33 |
| 2 | 51 | 0.30 |

TABLE 4-continued

| Construction | Minimum length/mm to avoid wrinkles, $L_{min}$ | $(D/A*(R/y_n))^{1/2}$/mm R = 6.4 mm |
|---|---|---|
| 3 | 64 | 0.43 |
| 4 | 64 | 0.46 |
| 5 | 83 | 0.56 |

Figure 9:
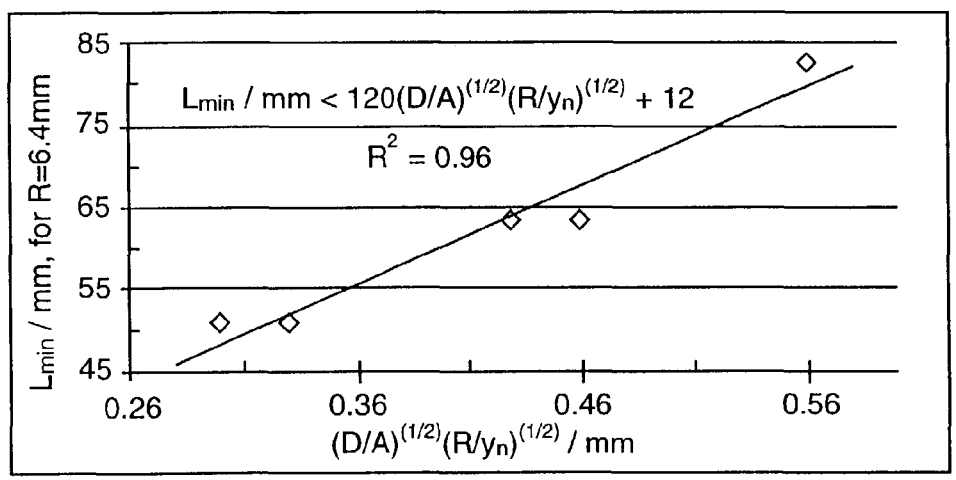
FIG. 9 is a graph illustrating correlation between predictive data and measured data for segmented sheeting in a wrinkle failure mode.

FIG. 9 shows a plot of $(D/A*(R/y_n))^{1/2}$ vs. $L_{min}$ for laminates of the study adhered to the test canvas substrate and bent around a mandrel having a radius of 6.4 mm. A linear regression fit is shown, as well as the equation and $R^2$ values. Using the regression fit shown in FIG. 9, a generalization about the minimum segment length that avoids the compression-wrinkling failure for a laminate-segment of specific stiffness and rigidity if forced to bend when a canvas is flexed can now be made. Specifically, where the conditions of EQN. 11 are met, wrinkling is generally avoided.

$$L_{min}/mm \leq 120\left(\frac{D}{A}\right)^{1/2}\left(\frac{R}{y_n}\right)^{1/2} + 12 \qquad \text{Equation 11}$$

$$R^2 = 0.95$$

The properties of the article relate to the final article, i.e., the article as used on the substrate. For example, if the carrier is meant to be removed from the final article as used on the substrate, then the carrier is not included in the calculations for the article.

The present invention has now been described with reference to several embodiments thereof. The foregoing detailed description and examples have been given for clarity of understanding only; no unnecessary limitations are to be understood therefrom. It will be apparent to those skilled in the art that many changes can be made in the embodiments described without departing from the scope and spirit of this invention. Thus, the scope of the present invention should not be limited to the exact details and structures described herein, but rather by the structures described by the, language of the claims, and the equivalents of those structures.

For use on vehicles having flexible sides (e.g., canvas-sided truck), it has been found that preferred sheeting segments have a length sufficient to accommodate any required homologation marking, more preferably have a length of at least 12 mm, most preferably at least 24 mm and optimally at least 48 mm. A suitable sheeting segment may be up to several feet long, if desired. Sheeting width is typically between about 30 mm and about 120 mm, more preferably between about 40 and about 100 mm. The gap size between adjacent segments may be regulated by a governmental body. Often the preferred gap size is that which meets the applicable regulation. For example, in the United States a preferred gap size is equal to the length of the shortest adjacent segment. In Europe, the gap size is preferably equal to one-half the length of the shortest adjacent segment.

Notwithstanding the above regulations, on canvas substrates the segment size and gap size are preferably chosen based upon the physical properties of the substrate. Free bending is facilitated when the sheeting segments are shorter. Also, the preferred gap size is somewhat dependant on the thickness of the substrate, with preferred minimum gap size being at least 2–4 times the thickness of the substrate. For a typical 50 mm long segment on a 0.53 mm thick canvas truck-side, the gap size is preferably at least about 4 mm. Larger gaps may be utilized, if desired.

The articles of the present invention can be made in a variety of ways. One preferred method comprises the steps of: (1) providing an elongate strip of a carrier having a first major surface and a second major surface; (2) providing an elongate strip of a retroreflective sheeting, wherein the sheeting has a first major viewing surface and a second major opposing surface (preferably an adhesive surface); (3) cutting the strip of retroreflective sheeting into discrete segments; and (4) attaching the first major viewing surface of the sheeting to the second major surface of the carrier. If desired more than one type of sheeting can be attached to the carrier. This may be done, for example, by sequentially attaching segments of a first sheeting type along the carrier and attaching segments of a second or subsequent type of sheeting in gaps between the first type of sheeting.

It may be desirable to rotate a sheeting segment prior to attaching it to the carrier. This may be done, for example, to conserve material. A diamond pattern can be cut with minimal waste from a strip of sheeting when cut as rectangles and then rotated 45 degrees. Also, a sheeting having a particular angularity (e.g., leftward) can be cut into squares and rotated 90 degrees, 180 degrees and 270 degrees to provide upward, rightward and downward angularity.

In another process a strip of sheeting can be provided on a stretchable liner, "kiss-cut" through the sheeting to the depth of the liner to form a plurality of segments on the liner; and stretched in one or more directions (e.g., lengthwise or widthwise, etc.) to separate the segments. A carrier can then be laminated to the separated segments (and the liner optionally removed) to provide a segmented sheeting article. This method generally includes the steps of: providing an elongate strip of a retroreflective sheeting on a release liner, wherein the sheeting has a first major viewing surface and a second major opposing adhesive surface protected by the liner; cutting (e.g., "kiss-cutting") the elongate strip of retroreflective sheeting into smaller discrete segments on the liner; stretching the liner in at least one direction (e.g., lengthwise or widthwise, etc.) to separate segments; and attaching, preferably "removably" attaching, the first major viewing surface of the sheeting to a second major surface of an elongate strip of a carrier having a first major surface and the second major surface In another process a strip of sheeting can be provided on a liner, "kiss-cut" to the depth of the liner to form a plurality of segments on the liner; and pieces of the sheeting removed to separate the remaining segments. A carrier can then be laminated to the separated segments (and the liner optionally removed) to provide a segmented sheeting article. In the event that the removed sheeting is not reused or reusable, this process is presently less preferred due to the resultant waste of the removed sheeting. This method generally includes the steps of: providing an elongate strip of a retroreflective sheeting on a release liner, wherein the sheeting has a first major viewing surface and a second major opposing adhesive surface protected by the liner; cutting (e.g., "kiss-cutting") the elongate strip of retroreflective sheeting into smaller discrete segments on the liner; removing selected portions of the sheeting to separate the remaining segments; and attaching the first major viewing surface of the sheeting to the second major surface of an elongate strip of a carrier having a first major surface and a second major surface.

Several methods may be employed when applying the retroreflective conspicuity article to a vehicle. One preferred process involves the steps of: (1) providing an elongate strip of a conspicuity article having a carrier having a first major surface and a second major surface and a plurality of discrete segments of a retroreflective sheeting, wherein the sheeting has a first major viewing surface and a second major opposing adhesive surface, and wherein the first major viewing surface of the sheeting is removably attached to the second major surface of the carrier; (2) exposing the second major opposing adhesive surface of the sheeting; (3) applying the adhesive surface of the sheeting to a surface of a vehicle to thereby adhere the sheeting to the vehicle. The applying step may optionally include the step of stretching the carrier to position the sheeting segments in desired position (e.g., around a corner, over a fold line in a canvas truck siding, over a rivet, etc.). Gaps in the article may also be shortened, when desired, by simply pushing the segments closer together.

In preferred embodiments the carrier is then removed to expose the viewing surface of the sheeting. This may be done, for example, by peeling the carrier off.

If desired, the above process may be performed multiple times along a substrate, e.g., to cause more than one type of sheeting to be adhered to the substrate. For example, a first application can provide a segmented article to be applied having large gaps between segments. A second application of a segmented article can be performed along the same line, thereby placing a second sheeting in a portion of the gaps.

A further advantage of the segmented articles of the present invention is that damaged segments may be easily repaired or replaced without having to cut the applied article.

The following examples are offered to aid in understanding of the present invention and are not to be construed as limiting the scope thereof These examples are offered to further illustrate the various specific and preferred embodiments and techniques and to further explain certain features and advantages. It should be understood, however, that many variations and modifications may be made while remaining within the scope of the present invention. Unless otherwise indicated, all parts and percentages are by weight.

EXAMPLES

Example 1

Conspicuity Articles (A) The following retroreflective sheeting materials were cut to the size and shape noted and used to construct various conspicuity articles:
  (A1) 3M #970 retroreflective sheeting—55 mm×55 mm square segments.
  (A2) 3M #983 retroreflective sheeting—55 mm×55 mm'square segments.
  (A3) 3M #981 retroreflective sheeting—55 mm×55 mm square segments.
  (A4) 3M #981 retroreflective sheeting—14 mm×55 mm rectangular segments.
  (A5) Sheeting available from Reflexite Corporation of Avon, Conn. sold under the trade designation "VC 104 Patt WH Curtain Grade Sheeting." Metalized, 50 mm×50 mm square segments.
  (A6) Sheeting available from Stimsonite Corporation of Parsippany, N.J. sold under the trade designation "4500 Sheeting." Metalized 52 mm×52 mm square segments.

(B) As a test substrate the following canvas was used:
  (B1) Verseidag Indutex/German, type Duraskin 12 B129835, Color #070 blue. The thickness of this canvas was about 0.53 mm.
(C) The following materials were used as an illustrative carriers:
  (C1) 3M product # TPM-5 ECF film. This is a polyethylene film with a low tack adhesive on one side and a silicone release coating on the opposite side. The thickness of this material is about 0.14 mm.
  (C2) 3M polyethylene Type 3112 tape. This is a low density polyethylene with low-tack adhesive on one side and a thickness of about 0.08 mm.
(D) The following material was used as an illustrative release liner:
  (D1) A Co-poly release liner film (about 0.085 mm thick) that comprises a propylene copolymer and is coated with a silicone polymer. Suitable liners are commercially provided with the aforementioned 3M #981 sheeting.

Example 1

Run 1

A conspicuity sheeting article was constructed according to FIG. 2a, wherein carrier 16 comprises the aforementioned carrier (C1) having a width equal to sheeting 12; sheeting 12 comprises 3M #981 retroreflective sheeting—55 mm×55 mm square segments; and liner 24a comprises the aforementioned liner (D1). Gaps between segments were between about 20 and 30 mm. In one embodiment alternating segments were rotated 90 degrees to give a tiling effect.

Example 1

Run 2

A conspicuity sheeting article was constructed according to FIG. 2a, wherein carrier 16 comprises the aforementioned carrier (C1) having a width equal to sheeting 12; sheeting 12 comprises 3M #970 retroreflective sheeting—55 mm×55 mm square segments; and liner 24a comprises the aforementioned liner (D1). Gaps between segments were between about 20 and 30 mm.

Example 1

Run 3

A conspicuity sheeting article was constructed according to FIG. 2a, wherein carrier 16 comprises the aforementioned carrier (C1) having a width equal to sheeting 12; sheeting 12 comprises 3M #983 retroreflective sheeting—55 mm×55 mm square segments; and liner 24a comprises the aforementioned liner (D1). Gaps between segments were between about 20 and 30 mm.

Example 1

Run 4

A conspicuity sheeting article was constructed according to FIG. 2a, wherein carrier 16 comprises the aforementioned carrier (C1) having a width equal to sheeting 12; sheeting 12 comprises Reflexite, VC 104 Patt WH Curtain Grade Sheeting. Metalized, 50 mm×50 mm square segments; and liner 24a comprises the aforementioned liner (D1). Gaps between segments were between about 20 and 30 mm.

Example 1

Run 5

A conspicuity sheeting article was constructed according to FIG. 2a, wherein carrier 16 comprises the aforementioned carrier (C1) having a width equal to sheeting 12; sheeting 12 comprises Stimsonite, 4500 Sheeting. Metallized 52 mm×52 mm square segments; and liner 24a comprises the aforementioned liner (D1). Gaps between segments were between about 20 and 30 mm.

Example 1

Run 6

A conspicuity sheeting article was constructed according to FIG. 7a, wherein carrier 16 comprises the aforementioned carrier (C1) having a 65 mm width; sheeting 12 comprises 3M #983 retroreflective sheeting—55 mm×55 mm square segments; and liner 24a comprises the aforementioned liner (D1). Gaps between segments were between about 20 and 30 mm. In this embodiment carrier extends past the sheeting segments and provides additional adhesion to a substrate.

Example 1

Run 7

A conspicuity sheeting article is constructed according to FIG. 2a, wherein carrier 16 comprises the aforementioned carrier (C1) having a width of 55 mm; sheeting 12 comprises 3M #981 retroreflective sheeting—14 mm×55 mm rectangular segments; and liner 24a comprises the aforementioned liner (D1). Gaps between segments are suitably between about 4 and 7 mm.

Example 1

Run 8

A conspicuity sheeting article was constructed according to FIG. 2a, wherein carrier 16 comprises the aforementioned carrier (C1) having a width equal to sheeting 12; sheeting 12 comprises 3M #981 retroreflective sheeting—55 mm×55 mm square segments (cut to provide red or white color segments); and liner 24a comprises the aforementioned liner (D1). Gaps between segments were between about 20 and 30 mm and alternating segments were colored either red or white.

Example 1

Run 9

A conspicuity sheeting article was constructed according to FIG. 2a, wherein carrier 16 comprises the aforementioned carrier (C2) having a width equal to sheeting 12; sheeting 12 comprises 3M #981 retroreflective sheeting—55 mm×55 mm square segments; and liner 24a comprises the aforementioned liner (D1). Gaps between segments were between about 20 and 30 mm. In one embodiment alternating segments were rotated 90 degrees to give a tiling effect.

The present invention has now been described with reference to several embodiments thereof. The foregoing detailed description and examples have been given for clarity of understanding only; no unnecessary limitations are to be understood therefrom. It will be apparent to those skilled in the art that many changes can be made in the embodiments described without departing from the scope and spirit of this invention. Thus, the scope of the present invention should not be limited to the exact details and structures described herein, but rather by the structures described by the language of the claims, and the equivalents of those structures.

Unless otherwise indicated herein or during examination, for purposes of both examination and construction of the appended claims: a claim written in a "Product-by-process" format shall be examined and construed as not being limited to products prepared by the particular process set forth in the claim; a claim that uses the term "means for" shall be examined and construed as being within the meaning of section 112(6); and claims that do not use the term "means for" shall be examined and construed as not being within the meaning of section 112(6); and the steps of a method claim may be performed in any order and are not to be limited to the order presented.

The section headings in this document are inserted for convenience only and shall not constitute a part hereof. The present invention may be suitably practiced in the absence of any element not specifically described above.

What is claimed is:

1. A method of applying a retroreflective article comprising a plurality of discrete segments of retroreflective sheeting to a flexible substrate, comprising the steps of:
   providing an elongate strip of an article having (i) a carrier with a first major surface and a second major surface and (ii) the plurality of discrete segments of retroreflective sheeting having a first major viewing surface and a second major opposing adhesive surface protected by a release surface, wherein the first major viewing surface of the discrete segments of retroreflective sheeting is attached to the second major surface of the carrier;
   exposing the second major opposing adhesive surface of the sheeting;
   applying the adhesive surface of the plurality of discrete segments of retroreflective sheeting to the flexible substrate to thereby adhere the plurality of discrete segments of retroreflective sheeting to the substrate, the discrete segments of retroreflective sheeting being spaced apart from one another on the flexible substrate a distance sufficient to prevent contact between adjacent segments when the substrate is bent a predetermined distance; and
   further comprising partially tearing the carrier along a plurality of discontinuities during the step of applying the adhesive surface of the sheeting to the flexible substrate.

2. The method of claim 1, wherein exposing the second major surface of the plurality of discrete segments of retroreflective sheeting comprises unrolling a roll containing the plurality of discrete segments of retroreflective sheeting.

3. The method of claim 1, wherein the exposing the second major surface comprises removing a release liner prior to applying the retroreflective article.

4. The method of claim 1, further comprising the additional step of: removing the carrier from the applied article to thereby expose the first major viewing surface of the sheeting.

5. The method of claim 4, wherein the carrier is extensible and permits the article to be positioned along an irregular surface of a substrate or along a curved path.

6. A method of applying a retroreflective article to a flexible substrate, comprising the steps of:

providing an elongate strip of a conspicuity article having an extensional stiffness, A, a bending rigidity, D, and a neutral axis a distance $Y_n$ from a first major surface of the final article, and adapted for attachment to a flexible substrate having an anticipated bend radius (r), the conspicuity article having (i) a carrier wit a first major surface and a second major opposing adhesive surface, wherein the first major viewing surface of the sheeting is attached to the second major surface of the, and wherein I is selected based upon calculating $$\sqrt{\left(\frac{D}{A}\right)\left(\frac{r}{y_n}\right)};$$

exposing the second major opposing adhesive surface of the sheeting; and applying the adhesive surface of the sheeting to the flexible substrate.

7. The method of claim 6, wherein the adhesive comprises a hot melt adhesive.

8. A method of applying a retroreflective article to a substrate, comprising the steps of:

providing an elongate strip of a conspicuity article having (i) an extensible carrier with a first major surface and a second major surface and (ii) a plurality of discrete segments of a retroreflective sheeting having a first major viewing surface and a second major opposing adhesive surface including a tackifier and being protected by a release surface, wherein the first major viewing surface of the sheeting is attached to the second major surface of the crier and wherein the segments are spaced apart from one another to prevent the contact between one another when the article is bent a predetermined amount;

exposing the second major opposing adhesive surface of the sheeting; and applying the adhesive surface of the sheeting to the substrate while stretching the carrier to direct application of the segments upon the substrate.

9. A method of applying a retroreflective article to a flexible substrate, comprising the steps of:

providing an article having a neutral axis a distance $y_n$ from a first major surface of the final article, and adapted for attachment to a flexible substrate having an anticipated bend radius (r), the article having (i) a carrier with a first major release surface and a second major surface and (ii) a plurality of discrete segments of a retroreflective sheeting of length 1 spaced apart from one another by a distance at least $$\frac{y_n}{r} \times l,$$

the segments having a first major viewing surface and a second major opposing adhesive surface, wherein the first major viewing surface of the sheeting is attached to the second major surface of the carrier and (iii) the article being provided in a roll so that the second major adhesive surface of the sheeting is adjacent the first major release surface of an adjacent layer of the carrier in the roll;

exposing the second major opposing adhesive surface of the sheeting; and applying the adhesive surface of the sheeting to the flexible substrate to thereby adhere the sheeting to the substrate.

10. The method claim 9, wherein exposing the second major surface comprises unrolling the roll.

11. The method of claim 9, further comprising the additional step of: removing the carrier from the applied article to thereby expose the first major viewing surface of the sheeting.

12. The method of claim 9, wherein the carrier is extensible and permits the article to be positioned along an irregular surface of a substrate or along a curved path.

13. The method of claim 9, wherein the second major surface of the carrier comprises an adhesive, the first major viewing surface of the sheeting is attached to the second major surface of the carrier with a second adhesion force, the sheeting provides a first adhesion force when attached to a substrate, and the first adhesion force is greater than the second adhesion force.

14. The method of claim 9, wherein the sheeting is selected from the group consisting of enclosed lens beaded sheeting, encapsulated beaded sheeting, prismatic sheeting and combinations thereof.

* * * * *

UNITED STATES PATENT AND TRADEMARK OFFICE
CERTIFICATE OF CORRECTION

PATENT NO. : 7,025,847 B2
APPLICATION NO. : 10/606911
DATED : April 11, 2006
INVENTOR(S) : Eugene H. Carlson It is certified that error appears in the above-identified patent and that said Letters Patent is hereby corrected as shown below:

<u>Column 8</u>
Line 35, delete "5,380,779," and insert -- 5,380,779; --, therefor.

<u>Column 19</u>
Line 34 (APPROXIMATELY), after "thereof" insert -- . --.

<u>Column 23</u>
Line 11, in Claim 6, delete "wit" and insert -- with --, therefor.
Line 15, in Claim 6, delete "I" and insert -- 1 --, therefor.
Line 38, in Claim 8, delete "crier" and insert -- carrier --, therefor.

Signed and Sealed this

Fifteenth Day of May, 2007

JON W. DUDAS
*Director of the United States Patent and Trademark Office*